US008751308B2

(12) United States Patent
Wojcicki et al.

(10) Patent No.: US 8,751,308 B2
(45) Date of Patent: Jun. 10, 2014

(54) LOCAL ADVERTISING RESPONSES

(75) Inventors: Susan Wojcicki, Los Altos, CA (US);
Smita Hashim, Saratoga, CA (US);
Navneet Loiwal, Sunnyvale, CA (US);
Jingxin Huang, Fremont, CA (US)

(73) Assignee: Google Inc., Mountain View, CA (US)

( * ) Notice: Subject to any disclaimer, the term of this patent is extended or adjusted under 35 U.S.C. 154(b) by 785 days.

(21) Appl. No.: 12/880,691

(22) Filed: Sep. 13, 2010

(65) Prior Publication Data

US 2011/0066498 A1 Mar. 17, 2011

Related U.S. Application Data

(60) Provisional application No. 61/241,803, filed on Sep. 11, 2009.

(51) Int. Cl.
*G06Q 30/00* (2012.01)
*G06Q 30/02* (2012.01)

(52) U.S. Cl.
CPC ........ *G06Q 30/0257* (2013.01); *G06Q 30/0253* (2013.01); *G06Q 30/0251* (2013.01); *G06Q 30/0241* (2013.01)
USPC .................. 705/14.55; 705/14.51; 705/14.49; 705/14.4

(58) Field of Classification Search
USPC ...................................................... 705/14.55
See application file for complete search history.

(56) References Cited

U.S. PATENT DOCUMENTS

| 6,414,635 B1 * | 7/2002 | Stewart et al. ................. 342/457 |
| 2002/0082938 A1 * | 6/2002 | Borger et al. .................... 705/26 |
| 2004/0037403 A1 | 2/2004 | Koch |
| 2005/0251445 A1 * | 11/2005 | Wong et al. ...................... 705/14 |
| 2007/0042760 A1 | 2/2007 | Roth |
| 2008/0313039 A1 | 12/2008 | Altberg et al. |
| 2009/0086958 A1 | 4/2009 | Altberg et al. |
| 2009/0164301 A1 | 6/2009 | O'Sullivan et al. |

OTHER PUBLICATIONS

Clear Rate, "Frequently Asked Questions: Toll Free FAQs", 2008, found on line at clearrate.com/tollfreefaqs.html.*
Korean Authorized Officer Kyoung Hee Hong, International Search Report and Written Opinion for Application No. PCT/US2010/048652, dated Mar. 28, 2011, 9 pages.
McGee, "Which Internet Yellow Pages Site Has the Best Rankings?" [online] Retrieved from the Internet: http://searchengineland.com/which-internet-yellow-pges-site-has-the-best-rankings-24065 [accessed on Aug. 22, 2009] 1 page.
Shotland, "IYP SEO Rankings Report 2009" (Aug. 12, 2009) Retrieved from the Internet: http://www.localseoguide.com/iyp-seo-rankings-report-2009/ [accessed on Aug. 22, 2009] 4 pages.
"Qire: Qire Launches Business Debt Recovery Service to Improve Collection Rates from Companies in Arrears" *Contact Center Solutions Industry News* (Jun. 3, 2009) Retrieved from the Internet: http://callcenterinfo.tmcnet.com/news/2009/06/03/4209831.htm [accessed on Apr. 26, 2011] 3 pages.

* cited by examiner

*Primary Examiner* — John G Weiss
*Assistant Examiner* — Scott C Anderson
(74) *Attorney, Agent, or Firm* — Fish & Richardson P.C.

(57) ABSTRACT

A computer-implemented method managing telephonic connections is disclosed. The method includes transmitting from a computer server system, for display on an electronic communication device, an advertisement from an advertiser; receiving from the electronic communication device a request to be connected telephonically with the advertiser; automatically playing a predetermined audio message after connecting telephonically with the advertiser; and connecting the electronic communication device telephonically with the advertiser after playing the predetermined audio message.

21 Claims, 12 Drawing Sheets

| LOCAL BUSINESS CENTER | SURFTEAM@PRINCETON.EDU | SETTINGS | HELP | SIGN OUT | ENGLISH(UNITED STATES) |

STEP 3: PAYMENT INFORMATION - HELP

CATEGORY: RETAIL
LOCATION: MOUNTAIN VIEW $45 MONTHLY FEE — 546

COMMON QUESTIONS — 542, 550
WHAT'S A QUERY?
HOW IS THE MONTHLY FEE CALCULATED?
WHEN DO I PAY THE MONTHLY FEE?
HOW DO I KNOW IF MY AD IS WORKING?
WHERE WILL MY AD SHOW?
HOW ARE GOOGLE LOCAL LISTING ADS DIFFERENT FROM ADWORDS?

SEARCH HELP TOPICS [ SEARCH ]

SIGN UP NOW FOR 30 DAY FREE TRAIL. CANCEL YOUR AD AT ANY TIME WITH NO OBJECTION.

CREDIT CARD INFORMATION
- TYPE OF CARD: [SELECT CARD TYPE]
- CREDIT CARD NUMBER: [ ]
- VERIFICATION CODE: [ ] WHAT'S THIS?
- CARD HOLDER'S NAME: [ ]
- EXPIRATION DATE: [JAN] [2006]

BILLING ADDRESS
- ADDRESS 1: [ ]
- ADDRESS 2: [ ]
- CITY: [ ]
- STATE OR PROVINCE: [ ]
- POSTAL/ZIP CODE: [ ]
- COUNTRY OR TERRITORY: [UNITED STATES]
- PHONE NUMBER: [ ]

PLEASE REVIEW THE GOOGLE LOCAL LISTING ADS TERMS AND CONDITIONS
YOU MUST ACCEPT THE GOOGLE LOCAL LISTING ADS TERMS AND CONDITIONS TO RUN YOUR ADS.

[ I ACCEPT CREATE MY AD. ]   [ CANCEL ]

FIG. 5D

LOCAL ADVERTISING RESPONSES

CROSS-REFERENCE TO RELATED APPLICATIONS

This application claims priority under 35 U.S.C. §119(e) to U.S. Provisional Patent Application Ser. No. 61/241,803, filed on Sep. 11, 2009, entitled "Local Advertising Responses," the entire content of which is hereby incorporated by reference.

TECHNICAL FIELD

This document relates to targeted on-line advertising and tracking of consumer responses to targeted on-line advertising.

BACKGROUND

Advertising drives a large part of our economy—businesses need to make potential customers aware of their offerings and the benefits of those offerings in order to survive. With targeted advertising, businesses can select which consumers will see their advertisements, such as by selecting keywords for their advertisements that will be match to query terms provided by consumers to a public search engine. Targeted advertising is generally better for businesses than general advertising because businesses can pay only to reach the particular consumers who are most likely to be receptive to their overtures. Such targeted advertising is common on the internet, and may be provided adjacent to search results (where the topics of the selected advertisements are matched to keywords in a search query), with content on web sites (where the advertisements displayed on the sites are matched to topics of items displayed by the sites), and in other areas.

Businesses are especially interested in so-called "conversion"—the process of turning an advertising impression into an actual sale or similar transaction. Conversion can be tracked on the internet, for example, by tracking user traffic from viewing an advertisement through a executing a transaction. A relative proxy for conversions may also be had by tracking the number of times that users react affirmatively to an advertisement, such as by clicking on advertisement copy that is shown to a user with search results or elsewhere. Consumers may also respond to an advertisement by physically going to a business or by calling the business on the telephone.

SUMMARY

This document describes systems and techniques for interacting with advertisers and consumers with respect to targeted on-line advertisements. By such systems and techniques, advertisers may be provided with multiple avenues by which to interact with consumers in a simplified manner. For example, a consumer who clicks on an internet advertisement may be taken to an alternative landing page that is not the home page for the advertiser. Instead, the alternative landing page may be served by the advertising system and may be populated with a composite of information that is typically of interest to consumers. For example, the page may include a map of a geographic area around the advertiser's facility and driving directions from the user's current location (e.g., as determined by GPS on a mobile device being used by the user) to the facility. In some implementations, the map and directions may be directed to one of the advertiser's multiple facilities, where the identified facility is the closest facility to the current location of the user's mobile device.

A user may also respond to an advertisement by clicking on a telephone number that is listed in the advertisement (or a label that represents a telephone number, such as a label that says "click to call"), and may then be connected automatically and telephonically to the advertiser's facility, in a click-to-call type of response. However, the telephone number associated with the object in the advertisement that the user selects may be a number that differs from the advertiser's number, such as by being a number held by a telephony management service like GOOGLE VOICE that is mapped to the advertiser's number so that a connection can be made readily between the consumer and the advertiser. By this mechanism, the user's response to the advertisement may be measured more readily (e.g., by counting the number of times the internal telephone number was used during an advertising campaign), and enhanced interaction may be provided that would not be available with a "straight" telephone connection between the consumer and the advertiser. As one example, a "whisper" message may be played to the advertiser when the advertiser picks up the telephone, telling the advertiser that a particular advertising service has made the telephone connection, and then the consumer and the advertiser may be connected over a telephone connection. In this manner, the advertiser can better understand where referrals for incoming telephone customers are coming from, and can increase advertising with the particular service if the advertiser starts to see lots of new business that is accompanied by the "whisper" message. The advertiser may also be provided a similar message by submitting identifying caller ID information that the advertiser can see before he or she picks up the telephone (e.g., to display the identity of the connecting service rather than of the customer).

Such a system may also permit advertisers to better pool their customer service resources. For example, where the target telephone number for an advertisements is a customer service representative (CSR), the "whisper" message may play the title of the advertisement and/or the name of the advertiser. The CSR may use such audible information to trigger a particular service script, from among multiple such scripts, that correlate to particular companies or products/services that are covered by that representative. For example, a CSR for an automobile company may be prepared to discuss the latest features for various car models, and the company's advertisements may include in their titles that are stored with the system 100 the name of each particular model that is advertised. Then, when the CSR receives an incoming call from the system 110, the model name may be spoken (e.g., via text-to-speech conversion) to the CSR, so that the CSR will be able immediately to discuss that particular model with the customer. Similar techniques may be used to enable a CSR to cover multiple divisions within a single company or multiple companies who share the CSR—e.g., via an outsourcing company that contracts to provide such services. The identification of the advertisement or advertiser may also be manual, such as by a speech-to-text converter that "listens" to the whisper, via the assignment of discrete tones to each advertisement where the tones convey data that identifies the particular advertisement or advertiser (with very limited information), or via a back-channel data connection, where identifying information about a routed call is transmitted to a data management system that corresponds to the CSR at the same time that the call is being connected, e.g., so that the CSR's computer screen will automatically display a screen pop of information about the particular advertisement or advertiser.

In one implementation, a computer-implemented method for managing telephonic connections is disclosed. The method comprises transmitting from a computer server system, for display on an electronic communication device, an advertisement from an advertiser; receiving from the electronic communication device a request to be connected telephonically with the advertiser; automatically playing a predetermined audio message after connecting telephonically with the advertiser; and connecting the electronic communication device telephonically with the advertiser after playing the predetermined audio message.

The details of one or more embodiments are set forth in the accompanying drawings and the description below. Other features and advantages will be apparent from the description and drawings, and from the claims.

DESCRIPTION OF DRAWINGS

FIGS. 5C and 5D show two portions of a screen shot of a sign up page for a targeted local advertising system.

Like reference symbols in the various drawings indicate like elements.

DETAILED DESCRIPTION

Figure 1:
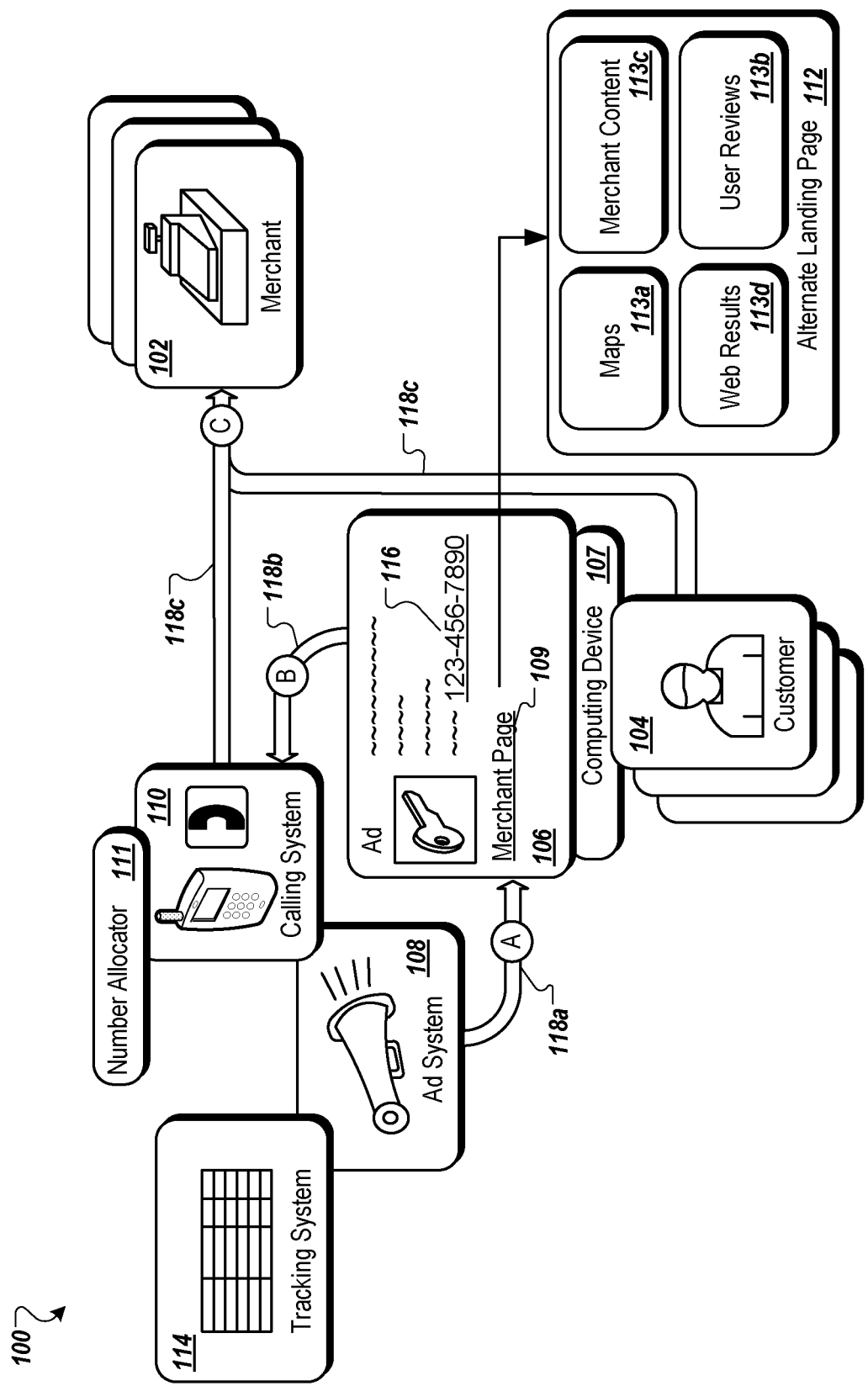
FIG. 1 is a conceptual diagram of a system for providing targeted advertisements to a consumer and allowing the consumer to interact with the targeted advertisements.

FIG. 1 is a conceptual diagram of a system 100 for providing targeted advertisements to a consumer and allowing the consumer to interact with the targeted advertisements. The system 100 may be used by various advertisers and consumers who can be connected in various ways, including via computer networks (e.g., the Internet, etc.), by telephone, direct mail, satellite, or other appropriate communication mechanism. As one example, a customer may initially "interact" with a merchant by accessing or receiving one of the merchant's advertisements online, such as while using a web browser on a smartphone or other portable device connected to the World-Wide Web. The targeted advertisement may appear, for instance, while the user is searching for certain products or services, and the user may interact with advertisements or other information that correspond to those businesses, including to the merchant of interest. The interaction may continue, for example, when the customer contacts one of the businesses using the "telephone" aspect of his portable device, such as "dialing" a click-to-call telephone number that appears in the online advertisement for the merchant of interest. For example, the user may click the link to "dial" the number that is displayed on his Internet-connected smartphone and may initiate a call directly or via a proxy number.

The system 100 may include several subsystems, all interacting in various ways, including subsystems involving advertisers, consumers, and various advertising systems. Advertising systems may allow merchants to create online advertisements and serve those advertisements to online users who are potential customers. Advertising systems may include interconnected software, hardware, firmware, data and communications that provide the connectivity among the subsystems, that allow merchants' advertisements to be served to a customer (e.g., in the customer's web browser), and process the customer's interaction in response to the advertisements. For example, the subsystems may provide web interactivity, telephony interactivity, and other interactivity (e.g., GPS, automobile-embedded systems, etc.).

In certain implementations of click-to-call functionality, the system 100 can connect a user with a merchant via a telephone connection (e.g., using traditional connecting techniques or more modern techniques such as VoIP) after the user views an advertisement for the merchant and chooses to call the merchant. The telephone connection may be made via a proxy number that is temporarily associated with the advertisement, and that maps to a telephone number for a facility that is operated by the advertiser, such as the advertiser's retail store, one of multiple retails stores (where the connection may be made with the store that is geographically closest to the user), or a telephone support network for the merchant. So that the merchant can better track the sources for its incoming business, and thus allocate advertising dollars better to the most productive sources, the system 100 may initially provide a "whisper" to the merchant before the system 100 makes the connection with the user, so that the merchant understands how it came to receive the particular call.

The system 100 may also provide the merchant with alternative Web-based mechanisms for communicating with potential customers. In particular, the system 100 may generate a custom landing page for a merchant so that users who click on an advertisement may be taken to the custom landing page (which may be hosted by the organization that operates the system rather than by the merchant) rather than to the merchant's home page. The various custom landing pages for different merchants can have a format that is common across many merchants, so that users of the system 100 will begin to understand the information that is available from such pages and immediately know how to interact with it. Such information may include a map showing a geographic location around the merchant's address, reviews for the merchant, descriptive information provided by the merchant, contact information for reaching the merchant (e.g., telephone number, email address, web page URL, click-to-call link), and other similar information.

Referring now more specifically to FIG. 1, the system 100 includes one or more merchants 102, each interconnected with multiple customers 104. Interconnectivity within the system 100 may include instantiation of an advertisement 106, such as an advertisement that is displayed on a web page that is in turn displayed in a web browser that operates on the customer's computing device 107 (e.g., a smartphone, etc.). Information in the advertisement 106 may be served by an advertising system 108, which may manage advertising campaigns for a great number (e.g., thousands or more) of merchants. The advertisement 106 may include merchant information such as graphics and text, and one or more merchant page links 109 that provide access to merchant home pages or and/or to alterative, merchant-based landing pages. The advertisement 106 may be displayed in combination with other information that is displayed in the user's browser, such as by being displayed adjacent to search results that result from the customer's latest searches, or through various user interactions (e.g., user selections, clicks, etc.).

The system 100 may also employ a calling system 110, capable of receiving and processing information from various telephone systems and resulting telephone calls related to customer interactions with merchants and their advertisements. The calling system may provide functionality, for example, that allows a user to select an object such as a hyperlink on an advertisement or other item that is displayed in a web browser, and have a telephonic connection made between their computing device and a destination device that is assigned to a telephone number that relates to the selected object.

The calling system 110 may be used in combination with a number allocator 111. The allocator 111 may allocate telephone numbers used by the system 100, such as numbers that may be correlated with click-to-call links may be displayed in the advertisement 106. The numbers may be numbers that are internal to the system 110, meaning that they are not numbers that would be dialed by any user outside the system. Rather, the numbers may be temporarily assigned to particular advertisements so that a number is invoked when an object in the advertisement is selected. That number may thus serve as a link between an advertising portion of the system 100 and the calling system. The invocation of the number may serve as a signal to the calling system 110 to make a connection between the user and a different number, such as the actual telephone number for one of the advertiser's physical facilities. As such, the internal number can serve as a form of proxy for the real number, and the system 100 can track the manner in which the number is invoked and the number of times it is invoked to perform various analysis, which is discussed in more detail below.

The number allocator 111 may control the assignment or allocation of telephone numbers to specific advertising campaigns. The telephone numbers that are assigned to a campaign may represent most or all of the direct inward dialing (DID) numbers associated with the click-to-call telephone numbers 116 used on the various advertisements 106. In order to achieve an efficient use of a finite set or block of local telephone numbers that may be accessible to the system 100, the number allocator 111 may recycle previously-used telephone numbers. As an example, when the number allocator 111 allocates a telephone number to a merchant's advertisement (e.g., in a new advertising campaign), that telephone number may have been used previously by the same or a different merchant 102 in a previous advertising campaign. In some implementations, assignment of reused numbers may follow a first-in, first-out (FIFO) pattern, assuring that the most stale or oldest numbers are used first.

In some implementations, the number allocator 111 may prevent the reuse of numbers unless their last-used date is sufficiently passed (e.g., more than two weeks or longer). In some implementations, the number allocator 111 may "reserve" (or automatically use) particular numbers for a merchant 102 if, for example, the merchant 102 had used that number before in a previous advertising campaign and believes that some customers have "learned" the number (e.g., if the actual number itself were shown with the advertisement). In some implementations, the system 100 (or in particular the advertising system 108) may allow a merchant 102 to pay a fee to reserve a particular telephone number, such as a telephone number that has digits that spell BUY-JAVA or other clever mnemonics. As a result, the "pool" of available numbers may depend on time gaps since their last use, or a combination of other factors.

In one example implementation, when an advertiser (e.g., a merchant 102) creates an advertisement for a listing, the advertiser may receive a Direct-Inward-Dialing (DID) number for the listing after the advertising system 108 requests a number from the number allocator 111 via the calling system 110 which may manage the telephone numbers and various routing and connecting of calls. The DID number may stay reserved for that pending advertisement listing for a certain amount of time (e.g., 20 minutes) during which the advertiser may save the advertisement (e.g., with the advertising system 108). When the advertisement is saved, an association is created mapping the DID number to the listing's telephone number, such as the merchant's existing general customer service telephone number or switchboard. When the advertisement is deleted, a grace period may be given after which the association is removed and the DID number is free to be given to another advertiser.

One or more alternative landing pages 112 may also be associated with each advertisement 106. The alternative landing pages are pages other than the advertiser's home page, which is typically the target of an advertisement or search result. As explained below, the alternative landing pages 112 may each contain the same type of information about different advertisers, where the actual content is customized to each particular advertisers. Particular information and formatting of alternative landing pages is discussed in more detail below.

Interconnectivity within the system 110 may also include other subsystems not explicitly shown in FIG. 1, such as systems associated with a user's global positioning system (GPS) device, embedded GPS functionality in the user's portable device, or other electronic (or non-electronic) devices. All subsystems of the system 100 may be further interconnected by a tracking system 114.

The tracking system 114 and the number allocator 111 may be used to track responses for particular advertisements over time. For example, the tracking system 114 may maintain logs that represent calls over time to particular telephone numbers that are maintained by the number allocator 111.

The logs may be used to associate particular advertisements or advertisers with particular DID numbers over certain timeframes. Information from the logs may be used, for instance, to generate statistical analysis, such as the total number of user interactions (e.g., calls received, etc.) by time and day of the week, the number of calls that lead to conversions, etc. Tracking may also be used to generate statistics that relate the number of visits to web pages, the number of clicks or other interactions on ads, the number of click-to-call occurrences, the number of ad-to-sale conversions, etc. Statistics may be tracked over time during the entire length of an advertising campaign. Comparative information may be broken down into statistics based on day of the week, time of day, geographic area, or customer demographics (e.g., gender, age, income, occupation, etc.).

As an example, and as will be described in detail with respect to FIG. 5B, statistics may be used to generate graphs (e.g., customer impressions and actions over time). Graphs and other forms of presentation may take the form of line graphs, bar graphs, pie charts, numerical tables, spreadsheets, or descriptive text, or any combinations of presentation methods. By analyzing and using the statistical information, merchants may be able to target advertisements for higher conversion rates, increased sales, or improved profit margins. As one example, if an advertising campaign provides statistics to a merchant that includes 783 impressions, but only 32 clicks on a web site, 29 clicks on the corresponding map, and zero clicks on driving directions, the merchant may conclude that the information that is provided in the ad's "impression" needs to be improved to increase overall click rates, and so on. The merchant may also conclude that potential customers are fully relying on the maps and ignoring the driving directions, which may lead to merchant adjustments in how each type of information is presented to the user (or potential customer).

Merchants 102 may include any private or public entity for which online advertisements may be produced. As one example, merchants may commonly include for-profit businesses that advertise on the Internet and sell goods and/or services. For instance, goods-selling merchants may include stores or outlets that sell hardware, groceries, sporting goods, toys, electronics, books, antiques, picture frames, clothing, shoes, appliances or building supplies, to name a few examples. In another example, service-providing merchants may include builders, contractors, hair salons, dog groomers, carpet cleaning, online advertisement providers, or any other service that may rely on advertising. In some cases, merchants may provide a vast combination of offered products and services. The system 100 may also support public and/or not-for-profit "merchants" such as municipalities offering inspections, libraries providing various branches throughout the community, or any government entity that may communicate online using methods conducive to advertising and interconnectivity by the internet and by telephone.

Merchants 102 may register with the system 100 by communicating with the advertising system 108. For example, a merchant 102 may contract with the advertising system 108 to provide and manage various online advertisements and advertising campaigns, such as advertisements that may appear on a potential customer's web page in response to browsing activity and/or web searches. A merchant 102 may initially contact the advertising system 108, for instance, to provide set-up information for one or more advertisements. The initiating information may include, for example, web page information, such as various web pages that the merchant may have online at one time. Information provided by the merchant 102 in setting up advertisements with the advertising system 108 may appear on one or more advertisements 106, as well as data provided for any of the alternative landing pages 112 such as maps 113a, user reviews 113b, merchant content 113c (e.g., products, services, hours or operation, prices, promotions, sales, etc.), and web results 113d, including URLs, links, click-to-call numbers, images, sound, animation, order taking/tracking, or any browser-renderable information corresponding to particular merchants and their advertisements and products/services The customer 104 may be any potential or actual customer of any of a merchant 102. As one example, the customer 104 may be a woman executing a web browser on a portable computer (e.g., a smart phone with roaming, wireless Internet access) who is searching the Internet for a suitable locksmith in the area around her. Her search may be designed to find a specific product (e.g., a double-lock door passage set for her house) or service (e.g., to duplicate a specific house key, to schedule installation of a home security system, etc.). As a result of the search, search results may be displayed in the woman's web browser, such as in the advertisement 106. Upon seeing the advertisement for a suitable locksmith merchant, the woman may select (e.g., click on) a click-to-call telephone number 116 (e.g., the telephone number 123-456-7890), automatically connecting the woman telephonically with the merchant 102 corresponding to the advertisement 106. The object that represents a click-to-call selection need not be displayed as a telephone number, and can instead simply be text of a hyperlink, such as the phrase "Click Here to Call." The woman's decision to contact that particular merchant 102 may be based on enticement, such as upon recognizing the click-to-call telephone number 116 as a local number, thus permitting a free call within the woman's telephone service. In some implementations, click-to-call telephone numbers 116 that are not local numbers may be displayed in a different color, such as red to indicate a long distance call.

In some implementations, the click-to-call number 116 may be displayed adjacent to an identifier that corresponds to a map position that shows a location or locations of the merchant. As one example, a letter code "A" inside a graphic symbol (e.g., a colored push-pin) may be displayed next to the click-to-call number 116, and the adjacent map may contain the same symbol and corresponding letter code "A." This may provide the user with a visual display of the merchant's exact location, such as relative to any landmarks, named streets and highways, or other merchants in the same category (which may have push-pin displays of their own).

The advertisement 106 may include several features that facilitate customer 104 interaction with merchants 102. For example, for any particular merchant 102 or one of their ads, the system 100 may provide one or more alternative landing pages 112, each accessible using a merchant page link 109, and each may be different from the merchant's primary landing page, or home page. In some implementations, alternative landing pages for a merchant 102 may be accessible when the user (e.g., a potential customer 104) selects any of the links or controls on the advertisement 106 or associated web pages. As one example, clicking on the click-to-call telephone number 116 may result in an alternative page being displayed, such as a web page that includes additional information about the merchant 102 including, for instance, a map to the merchant's location, driving directions, etc.

Any such information may incorporate the use of location information obtainable from the user's portable computer device. For example, driving directions displayed on the alternative page may "start at" the user's current location, as obtained from GPS or other navigational positioning systems, including cell telephone towers within range of the user.

Although the actual number for an advertiser facility may be displayed, and may cause the user's computing device to dial that number through a telephone network, the system 100 may also route calls itself to provide an indirect connection. Such internal routing may enable the system, as discussed above and below, to better track responses that users have to advertisements they have seen.

For instance, the click-to-call telephone number 116 may simply be a temporary intermediate telephone number, assigned by the advertising system 108 to the merchant 102 for the duration of the merchant's advertising campaign. By calling the click-to-call telephone number 116, either by selection off the advertisement 106 or by button presses on a portable telephone, the user may be automatically connected, via the system's interconnect sub-system (such as the well-known GOOGLE VOICE system) to the merchant's 102 primary customer service or other telephone line, automatically redirected using intermediate telephone numbers assigned by the advertising system 108.

The calling system 110 may also provide information to the merchant 102 in addition to simply connecting a customer to the merchant's telephone. The information may include, for example, identification of the source of the incoming call, such as a "whisper" (e.g., "Customer connecting from online ad XYZ") that the merchant hears when answering the telephone. In some implementations, the information may include identification of the customer 104 as a repeat customer and may provide the customer's name, telephone number, order status and brief customer history. The information may also include a title of the advertisement and/or a name of the advertisers, so that a person receiving the call may know best how to interact with the caller when that person is covering for multiple different advertisements or multiple different advertisers (e.g., if the person is a customer service representative for a company that provides coverage for many advertisers). Such information may permit the merchant to better track the effectiveness of an advertising campaign, and to better serve the customer (e.g., by knowing which advertisement the customer saw and what the customers will want to talk about).

The tracking system 114 may provide a variety of analysis and reporting capabilities. For example, the tracking system 114 can track any appropriate information in the system 100, such as intermediate telephone numbers that are displayed as click-to-call telephone numbers 116 on advertisements 106, intermediate telephone numbers currently in use or ready for reuse, or any other tracking information used for advertisements that the advertising system 108 serves for the merchant 102.

In the case of intermediate telephone numbers to be reused, the telephone numbers may belong to a finite collection of local telephone numbers that are assigned to a particular advertiser or advertisement during the course of an advertising campaign. For instance, once a merchant's advertising campaign ends, the number for connecting customers through the advertisement may be released back into a rotating pool, but the tracking system 114 can record that the number was assigned to the particular advertisement during the relevant time period. The number may then be re-assigned to a new merchant 102, for example, after a sufficient cooling-off period (e.g., days or weeks) has passed since the last customer used the number in a click-to-call scenario. This cooling off period helps ensure that a connection that was intended for the prior-running advertisement but was made slightly after the end of the prior-running campaign, is not accidentally connected to another advertiser or counted toward the statistics for the later advertiser. Hence, the same intermediate telephone number may appear be associated by the system with a first advertisement 106 for a period of time, followed by a cooling off period before being associated with a different advertisement 106 for a different (or the same) merchant 102. The cooling off period may be set at a predetermined time, and where the intermediate number is actually shown to the customer that period can be relatively long (e.g., a few weeks or months), so as not to confuse or misdirect potential customers 104.

The system 100 may be particularly well-suited for local ads, such as advertisements that are directed to users in a particular geographic location. In one example, a user's location may be determined by keywords in a search (e.g., Minneapolis locksmiths), GPS signals from a telephone (e.g., a user's current location in Minneapolis), an IP address (e.g., of a known Minneapolis resident), by cell tower location, etc. In response to a search query by such a user, the system may provide search results of merchants 102 that match the user's (and a potential customer's 104) current geographic location.

As one example, a user may enter search terms that correspond to coffee. The search results may include web pages, or links to web pages, that correspond to merchants 104 having facilities in the area that sell brewed coffee, such as Starbucks, Caribou, Cameron's Coffee, etc. The search results may provide one location or multiple locations, such as if a chain of coffee shops has multiple facilities in the same area (e.g., within a 5 mile radius). In some implementations, the user may be able to select a control such as "just give the me closest one" or a control that says "give me the five closest ones." In some implementations, the system 100 may make use of the direction of travel of the user by determining the user's current GPS location and direction of travel and anticipating the general area in which the user is heading, such as if the user is a passenger in a car or on mass transit heading toward a downtown area. In such cases, the search results may rank those locations in the direction of the user's travel higher in the search results, based on the user's direction of travel and/or expected destination.

Regardless of the search results and whether one or multiple merchants 102 and their advertisements 106 are returned in response to the search query, the corresponding address and telephone number of each merchant may be provided, along with a map and driving instruction to each merchant facility where appropriate. Any geographic-based information provided by the system to the user may make use of the user's current location, such as that provided by a GPS or other location tracking device in the user computing device (e.g., the user's smartphone, etc.). For instance, maps may include a "You are here" marker.

In one example sequence of events within the system 100, a user (or potential customer 104) may be executing a web browser on his computing device 107 (e.g., a smart phone or any other mobile wireless Internet access device). For instance, in the browser's search box, the user may enter search terms (e.g., "local coffee shops") in order to have the web browser generate a list of search results that relate to nearby coffee establishments.

In some implementations, incorporating query terms such as "local" or "nearby" may signal the system 100 to add a geographic element or local flavor to the search, basing the search in part on the user's location, such as GPS coordinates, IP address, known city of residence, etc. For instance, a user who travels the world may have in his favorites a search query that automatically identifies local coffee shops no matter where the query is executed. (Such a search may be persistent and automatic also, so that nearby coffee shops are shown automatically whenever the user opens a search box or a mapping application).

As the result of submitting the executed query (e.g., "local coffee shops") to a remote search engine and receiving search results in response, the browser may serve the results in response to the query, and the advertising system 108 may provide the browser with the corresponding advertisements, as indicated by arrow A 118a. For instance, the user's screen may be populated with search results that list various coffee shops in the area as well as advertisements 106 that are associated with local coffee shops. Each advertisement 106 may be associated with a click-to-call telephone number 116 or other temporary local telephone number that is in turn associated with the particular coffee shop. The number may be represented, for example, by a selectable link or other selectable object that is displayed by the browser.

The advertisement 106 may also include one or more merchant page links 109, each capable of landing the user on an alternative landing page 112 if the corresponding link is clicked or selected. For example, clicking on the merchant page link 109 for a particular coffee shop may redirect the user to the coffee shop's corresponding alternative landing page 112, where the user may view a map 113a, user reviews 113b, merchant content 113c and web results 113d.

Alternatively, or in addition, if the user clicks on the click-to-call telephone number 116, the system 100 may invoke the calling system 110, as indicated by arrow B 118*b*. The local telephone number (e.g., 123-456-7890, that corresponds to a specific coffee shop) may be passed or provided by the advertisement 106 (e.g., by the browser or by a central system that passes messages from the browser) to the calling system 110. As a result, the calling system 110 may "connect" or bridge the customer 104 to the merchant 102, as indicated by arrows C 118*c*.

Upon first answering the telephone, the merchant 102 may hear a "whisper" such as "a call from a new customer sourced from advertisement XYZ." The resulting call may include questions from the customer asking about specific coffee beans that are used in coffee beverages for sale, or the customer may want to know the price per pound of a particular variety (e.g., organic, Columbian, shade-grown, Free Trade) of whole coffee beans, to name a couple examples.

In some implementations, the system may monitor a call between a user and a merchant, with the assent of both parties. During this time, for instance, the user or the merchant may use voice commands, such as commands or sentences that contain the name of a product or system, the word "help" or a specific phrase (e.g., "finding whole coffee beans") to name a few examples. The calling system 110 may include functionality to process such user questions and voice prompts, such as by comparing the user's spoken words to pre-stored hashed representations of particular trigger words. User privacy could still be maintained during this time, such as by hashing the data for the sounds on the telephone line with pre-stored hashed values.

In response to the user's voice commands, etc., the system 100 may automatically execute responses, such as specific responses that correspond to past questions generated by previous customers. The questions and responses may be stored, for example, in a knowledge base or other system. As a result, answers to user questions may be sent to the user over the telephone connection, and may be heard by the customer and the merchant.

As one example, the merchant may have a low price guarantee, and to prove it, the merchant may invoke an on-line shopping search engine (e.g., supporting voice recognition), speak the name of the product in which the consumer is interested, and have the service read back the search results with prices. The merchant may then agree (or not agree) to meet such a price. In another example, an employee of the merchant may simply report back a price, or start a recording audible to the customer that provides price and other product information to the customer over the telephone.

In some implementations, the system 100 may handle customer interaction with advertisements that are embedded in email messages that result from web activity. For example, the user may receive an email message after interacting with a merchant's online ad, and the email message may contain a clickable telephone number for contacting the merchant. The telephone number may be accompanied by other information in the body of the email that may entice the potential (or repeat) customer to contact the merchant. As a result, the customer may select (e.g., click on) the click-to-call telephone number and initiate conversation with the merchant, such as to buy a product or service. In some implementations, when the merchant's advertising campaign expires, the customer may receive an automatic email message that may, for example, provide a permanent telephone number (and corresponding link) for the merchant to replace the temporary click-to-call number that originated from the advertisement. In this way, the merchant may build customer loyalty and retain potential telephone connectivity long after the advertising campaign has ended.

Figure 2:
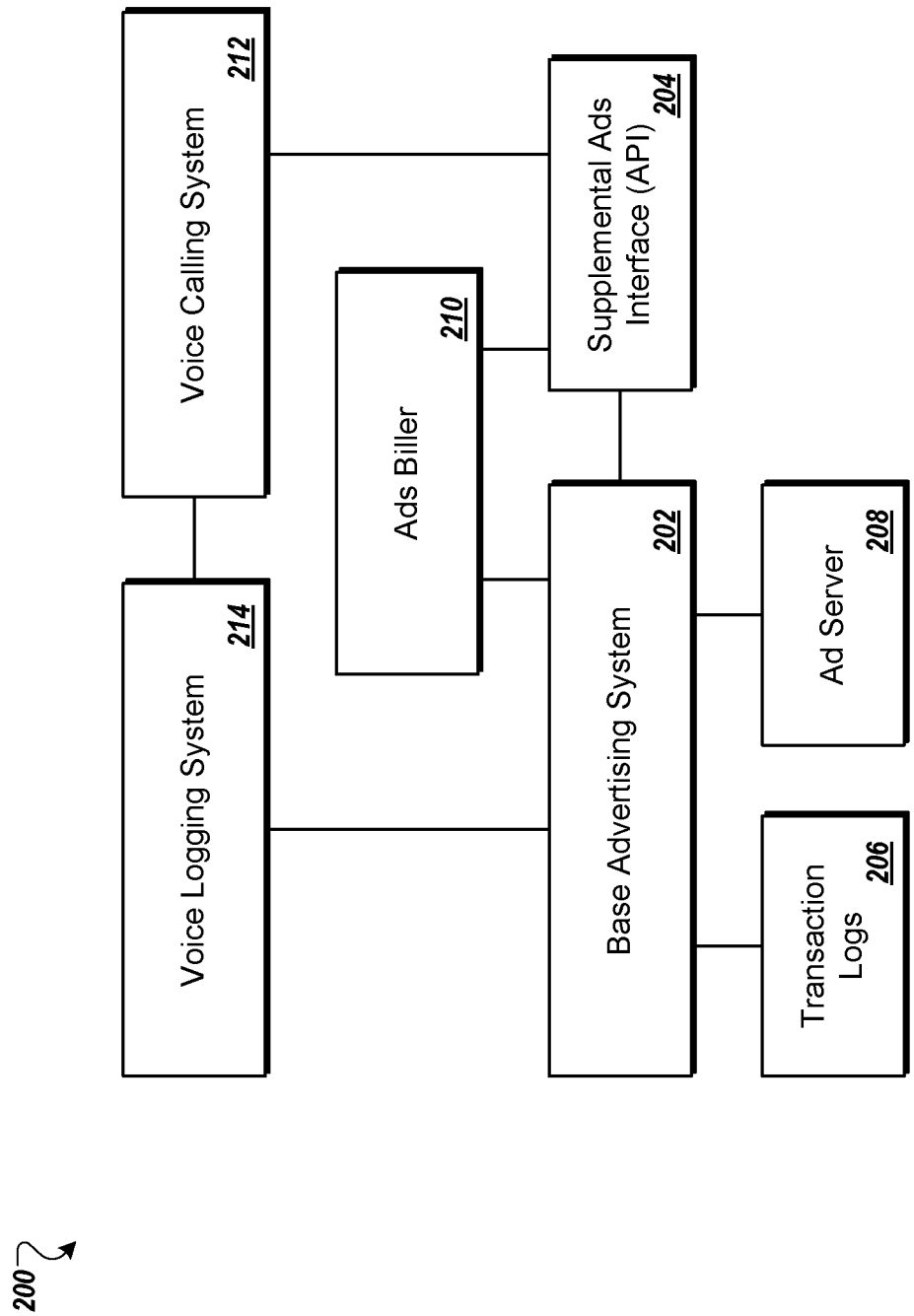
FIG. 2 is a block diagram of a system for connecting consumers to advertisers via a bridging telephone connection.

FIG. 2 is a block diagram of a system 200 for connecting consumers to advertisers via a bridging telephone connection. The system 200 may be used, for example, to support the system 100 described with respect to FIG. 1, such as when a customer 104 interacts with an advertisement 106 for a particular merchant 102.

The system 200 includes a base advertising system 202, a supplemental advertisements interface 204, transaction logs 206, an advertisement server 208, an advertisements biller 210, a voice calling system 212 and a voice logging system 214. Other components not explicitly shown in FIG. 2 may also exist in the system 200, such as software applications or other components that interface with (or provide interconnectivity among) other aspects or functionality of the user's computing device 107, the advertising system 108, advertisements 106, or the merchant 102.

The base advertising system 202 may be any appropriate advertisement provider, such as GOOGLE ADWORDS, that sells, manages and serves online advertisements for merchants (where merchants can include providers of goods or services, or other individuals or organizations that are seeking to provide promotional materials to user of the system 202). For instance, a merchant that wants to establish online advertisements may contact the base advertising system 202 with information about a new advertising campaign, such as a coffee house setting up an advertisement for one or more coffee shops in an area, a locksmith establishing advertisements for key duplication services or home security system products, and so on. Moreover, merchants may contact or otherwise access the base advertising system 202 numerous times during an advertising campaign to make changes in the ad, such as new or existing product information, services offered, hours of operation, pricing, sales and promotions, etc. Various general techniques for accepting registration of advertisers, submissions of advertisements, and management of advertising campaigns are well known and are not discussed in detail here.

The supplemental advertisements interface 204 may provide the extra computer software or application logic needed by the system 100, for example, to facilitate the kinds of click-to-call scenarios, etc. described with respect to FIG. 1. As one example, application programming interfaces (APIs) may be used to implement the example click-to-call sequence of events described above with respect to FIG. 1. These events may include, for instance, forwarding to the calling system 110 an indication of an intermediate local number corresponding to an advertisement that has been selected by a user, providing the "whisper" heard by merchants 102 when a call is received from an online advertisement source, or other services that an API may provide inside computer applications. The base advertising system 202 may interact with the supplemental advertisements interface 204 whenever services (e.g., click-to-call selections, etc.) not performable by the base advertising system 202 are needed.

The transaction logs 206 may retain various types of transactions related to the system 200 (and the system 100). In one example, information from transaction logs 206 may be used to manage pools of DID numbers and their associations with forwarding click-to-call numbers and advertiser data. In one specific case, transaction logs may be used to identify the last time any particular DID number was used, such as a DID number no longer in use in a merchant's just-ended advertising campaign that may be releasable for re-use in other advertisements. In another example, information in transaction logs 206 may be processed quantitatively, for instance to generate statistics that relate to an advertisement's overall performance or effect, including the advertisement's impressions or the number of user clicks, map viewings, accesses to driving directions, or conversion to sales, etc.

Information in the transaction logs 206 may provide association and de-association information over time, for finite time periods, or for historical reference. Information in the transaction logs 206 that is deemed to be of no value may be purged over time, either manually after review by an advertisement manager, or automatically such as using a regularly-scheduled cron job. Requests for purging or other maintenance may originate in the base advertising system 202.

The advertisement server 208 may serve the merchant's advertisements, such as on the internet. The advertisements may be served, for instance, to users who execute web browsers, view search results, or view and interact with embedded or non-embedded advertisements, etc. For example, the advertisement server 208 may serve targeted advertisements that are related to coffee shops to any user accessing information (e.g., though a browser, etc.) related to coffee. The advertisement server 208 may manage the vast majority of advertisement related information, such as web and advertisement content (e.g., text, graphics, sound, animation, links, etc.), mechanisms for serving the targeted advertisements to specific users (e.g., based on the user's search terms, interests, current geographic location, IP address, etc.), and mechanisms for handling user interactions with the advertisements (e.g., what to do when the user clicks here or there). Whenever the advertisement server 208 serves an ad, notification may be made to the base advertising system 202, for example, in order to track which advertisements have been served, when the advertisements were served, and to whom. The base advertising system 202 may also push advertisements to the advertisement server 208 that are ready to be served when needed. Modifications to existing advertisements may also be pushed to the advertisement server 208.

The advertisement biller 210 may serve as the billing, revenue collecting, and accounting agency of the base advertising system 202. Such billing may occur in manners like that provided by existing advertising systems such as the GOOGLE ADWORDS system. For example, merchants that hold advertising campaigns may initially be billed by the advertisement biller 210 initially upon setting up advertisements in advertising campaigns. Billing may also occur over time, such as in regular (e.g., hourly, daily, weekly, monthly, etc.) installments in order to pay the cost of maintaining the advertisement on the Internet. Other billing may occur whenever the merchant makes changes to an ad, such as adding more complexity, additional bells and whistles, or the incorporation of click-to-call numbers or alternative landing pages.

In some implementations, the advertisements biller 210 may be responsive to customer-made calls associated with the supplemental advertisements interface 204. For example, when a click-to-call operation is performed for an advertisement, the advertisements biller 210 may be notified and may be provided with an identifier for the relevant advertisement. In some implementations, the notification may be, for example, an API call that triggers the advertisements biller 210 to make an automatic accounting entry to bill the merchant who ran the advertisement for the call. The amount of the accounting entry may correspond to the per-call rate upon which the merchant agreed when establishing the advertising campaign with the base advertising system 202.

The voice calling system 212 may implement certain aspects of the click-to-call feature of the system 100. As an example, the voice calling system 212 may be invoked when a user or potential customer selects or clicks on a click-to-call link. At that time, the voice calling system 212 may invoke the calling system 110 described with respect to FIG. 1 and cause a call to be placed to the merchant. The number dialed during the call may be, for instance, the actual merchant telephone number that is pre-mapped to the intermediate, temporary DID number assigned to the advertisement. The voice calling system 212 may use available telephony features of the user's computing device 107, such as the mobile telephone aspect of the user's smart telephone or other portable, wireless Internet access device equipped with phoning capabilities.

In some implementations, within either of the systems 100 and 200, if the user's computing device 107 has no built-in telephony capabilities, the voice calling system 212 may make use of free or inexpensive, but commonly available, phoning systems, such as Skype or other systems for connecting users (e.g., customers and merchants) by voice. In some implementations, the connection may also include a video feed, allowing the customer and merchant to interact face-to-face over the Internet. The voice calling system 212 may interact with the voice logging system, for example, in order to log voice calls that are made. The voice calling system 212 may also interact with the supplemental advertisements interface 204 when, for example, API calls are made that facilitate voice calls.

Also, the voice calling system 212 may use dial back functionality to complete a call. In particular, a user may have a telephone number associated with their account so that, when the user selects a click-to-call link, the system 212 dials their number and then connects them to the merchant telephone number once they have picked up.

The voice logging system 214 may allow logs to be captured that relate to click-to-call occurrences or other events. For example, the logs may indicate the number that was dialed and the advertisement associated with the connection, so that the system may later determine what calls were completed for which advertisements. Such as feature may be helpful when a pool of intermediate DID telephone numbers is used, and is allocated over time to different advertisements and/or advertisers. The voice logging system 214 may also track the number of calls received, who the calls were from, the duration of the calls, and any other relevant information or metadata associated with calls. The voice logging system 214 may interact with the base advertising system 202, such as when new advertisements are defined within the system 200, in order to establish parameters for logging calls. The voice logging system 214 may also interact with the voice calling system 212, for example, logging voice calls as they occur.

Each of the components shown in FIG. 2, as with appropriate components shown in FIG. 1, may be implemented using one or more servers connected and communicating according to pre-arranged programming interfaces. In particular various servers in an existing advertising system may be supplemented with capabilities to track telephonic and alternative landing page interactions with an advertisement, as well as mechanisms for providing local-based content with advertisements. The advertising system may then be supplemented by an existing telephonic connection system, where the advertising system may pass data to the telephonic connection system to allow a connecting call to me made. Such data may include an identifier so that the telephonic connection system can identify the user and the merchant for making the connection, and could also include information to enable a custom whisper to be provided. For example, the advertising system could pass an audio file or text of the advertiser name or advertisement title so that the telephonic connection system can play such text as a whisper. Other information may also be passed between the systems, as discussed above and below.

Figure 3A:
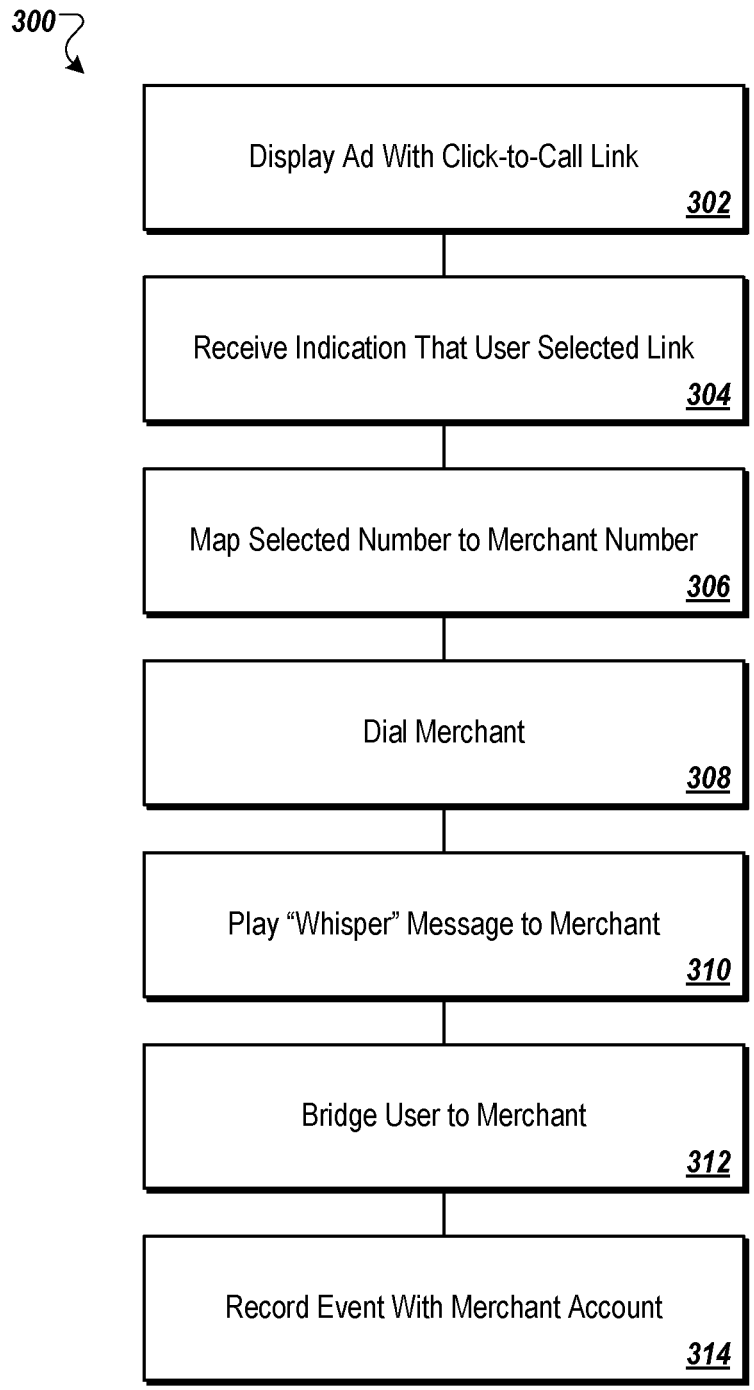
FIG. 3A is a flow chart of a process for connecting a consumer to an advertiser via telephone routing.

FIG. 3A is a flow chart of a process 300 for connecting a consumer or customer to an advertiser via telephone routing. The example process 300 includes steps that may be used, for instance, in providing advertisements and handling user responses to the advertisements in the systems 100 and 200, as described with respect to FIGS. 1 and 2, respectively. The process 300 generally involves showing a targeted advertisement to a user (e.g., where the advertisement is supplied with search results and is targeted to a search query that a user entered, or where the advertisement is targeted to content on a web page in which the advertisement is incorporated), receiving a selection by the user relating to the advertisements, and connecting the user telephonically to the advertiser after playing a message over the telephonic connection to the advertiser (where the advertiser can include an employee at a facility operated by the advertiser, or a customer service representative who is working on behalf of the advertiser).

At box 302, an advertisement with a click-to-call link is displayed. The advertisement may be served, for instance, by the advertising system 108 and displayed by the user's web browser as the advertisement 106. For example, the advertisement may refer to a specific local hardware store that is promoting and selling environmental and energy-efficient LED bulbs. The advertisement may be served, for instance, along with search results in response to the user's search query for neighborhood hardware stores, such as if the user is looking for a place to buy a box of nails. The advertisement may include a control that serves as a click-to-call as part of a message saying, "Call NOW to reserve your GREEN LED bulbs!" The control may have associated with it an identifier that identifies an intermediate DID number that was associated with the advertisement when the advertiser first added the advertisement to the system. The click-to-call link that is displayed may also resemble the click-to-call telephone number 116 (e.g., the telephone number 123-456-7890) described with respect to FIG. 1.

At box 304, an indication is received that the user has selected the link, for example by the user clicking on the link and an appropriate signal being generated by the user's browser, which may be accompanied by a passing of information from the user's device to a remote server system that served the advertisement. User selection may occur in various ways, such as by using a mouse click, keyboard entry, stylus, voice commands (e.g., by speaking "CLICK TO CALL") or any other selection method that the user's electronic device (e.g., smartphone, etc.) may recognize as a selection action. The indication that the user selected the link may be captured by the user's browser, which may in turn forward the indication to the advertisement server (e.g., the advertisement server 108) for processing.

The number that corresponds to the selected control is mapped to the merchant number at box 306. In some cases, the mapping may redirect the user to a local number in the same or a different area code, or the merchant number may be a type of 800 number. For instance, continuing with the current example, the telephone number 123-456-7890 in the click-to-call link may map to an actual merchant number of 402-555-1437.

The intermediate number that is associated with an advertisement may, in certain implementations, map to multiple merchant numbers. For example, where a merchant operates at a number of different locations (e.g., a national coffee house chain), the merchant may want customers to be able to make telephonic contact with the facility that is closest to the customer. In such a situation, information about the user's location may be obtained (e.g., GPS data that is sent from the user's device when information about the user's selection of an on-screen object is sent) and the user's location may be mapped to locations that are associated with each of the different telephone numbers for the merchant (e.g., using a location server that, when given two addresses or lat/long combinations, can identify a distance between the two points). The appropriate selected number for the merchant may then be correlated to the intermediate number and connected to the user by the system.

At box 308, the merchant is called. For example, using the actual merchant number (e.g., 402-555-1437), a telephone call is initiated with the merchant (e.g., the hardware store offering LED bulbs). The call may be placed, for example, by the calling system 110, using telephone lines (wired or wireless), via a VoIP interface, or by other mechanisms.

At box 310, a "whisper" message is played to the merchant once the system detects that the merchant's telephone has gone "off hook." For example, as the merchant answers the incoming call, but before the customer is connected, the merchant may hear the whisper identifying the source of the call. In this example, the whisper may say, "customer calling RE: LED ad #3 on Internet." Whispers may last just a few seconds in length so as not to significantly delay the merchant in talking to the potential customer. The merchant may use this information in the whisper, for example, to differentiate calls from other sources, such as advertisements #1 and #2 or others on the Internet (e.g., for LED bulbs) or advertisements for other products (e.g., wood tiles). In some implementations, the merchant may use this information to make real-time adjustments to advertisements based on their apparent effectiveness in generating telephone calls.

The user is bridged to the merchant at box 312. As an example, the consumer interested in LED bulbs may now talk directly to the merchant whose Internet enticed the user to call. At this time, the merchant knows exactly why the user is calling.

The process may also be programmed to handle situations in which a merchant does not answer. For example, well-known outbound-calling techniques may be used to ensure that a human answered the telephone for the merchant, and that the call did not simply reach an answering machine of voice mail box. In situations where a live connection cannot be made, the customer can be told that a connection was not possible, a pre-recorded message may be played to the customer (e.g., that includes information in addition to that shown in the web advertisement) such as a message that may have been recorded by the advertiser when they first set up the advertisement with the process, and/or the customer may be prompted to leave a message for the merchant. Such a message may be stored by the system until the merchant calls in to obtain messages, may be forwarded to a separate voice system for the merchant (e.g., with the merchant's telephone carrier), and may be automatically or manually transcribed and sent to the merchant such as via email.

In some implementations, the whisper may include voice hash patterns, voice recognition, or other discernable distinguishing audible characteristics so that incoming calls related to LED bulb Internet ads, for example, may be automatically directed to the telephone number or extension for the hardware store's Electrical Department, while calls related to wood tiles may be routed to the Flooring Department's extension. For example, simple audio encoding mechanisms may be used so that the whisper, via beeps or other sounds, can transmit data to an automated system operated by the merchant.

In some implementations, if the source of the call is known and special conditions exist at the merchant site, the merchant's telephone system may intercept the call and play a message that is made audible to the caller such as, "Our LED bulb expert is busy right now but will call you in a few minutes" or "sorry, we're sold out of LED bulbs" to name a few examples.

At box 314, the event is recorded with the merchant account. As an example, the fact that a potential customer has used the click-to-call feature in a particular advertisement to ask about LED bulbs is captured by the system (e.g., by components of systems 100 or 200). Specifically, the merchant's account information related to LED ad #3, for example, is updated, such as to charge the merchant for the call or simply to log its occurrence. Recording of the event may include the exact day and time of the call as well as other information, such as the user's location at the time the call was placed (e.g., based on GPS) or demographic information, if known.

The process 300 is just one example set of steps as others are possible in other implementations.

Figure 3B:
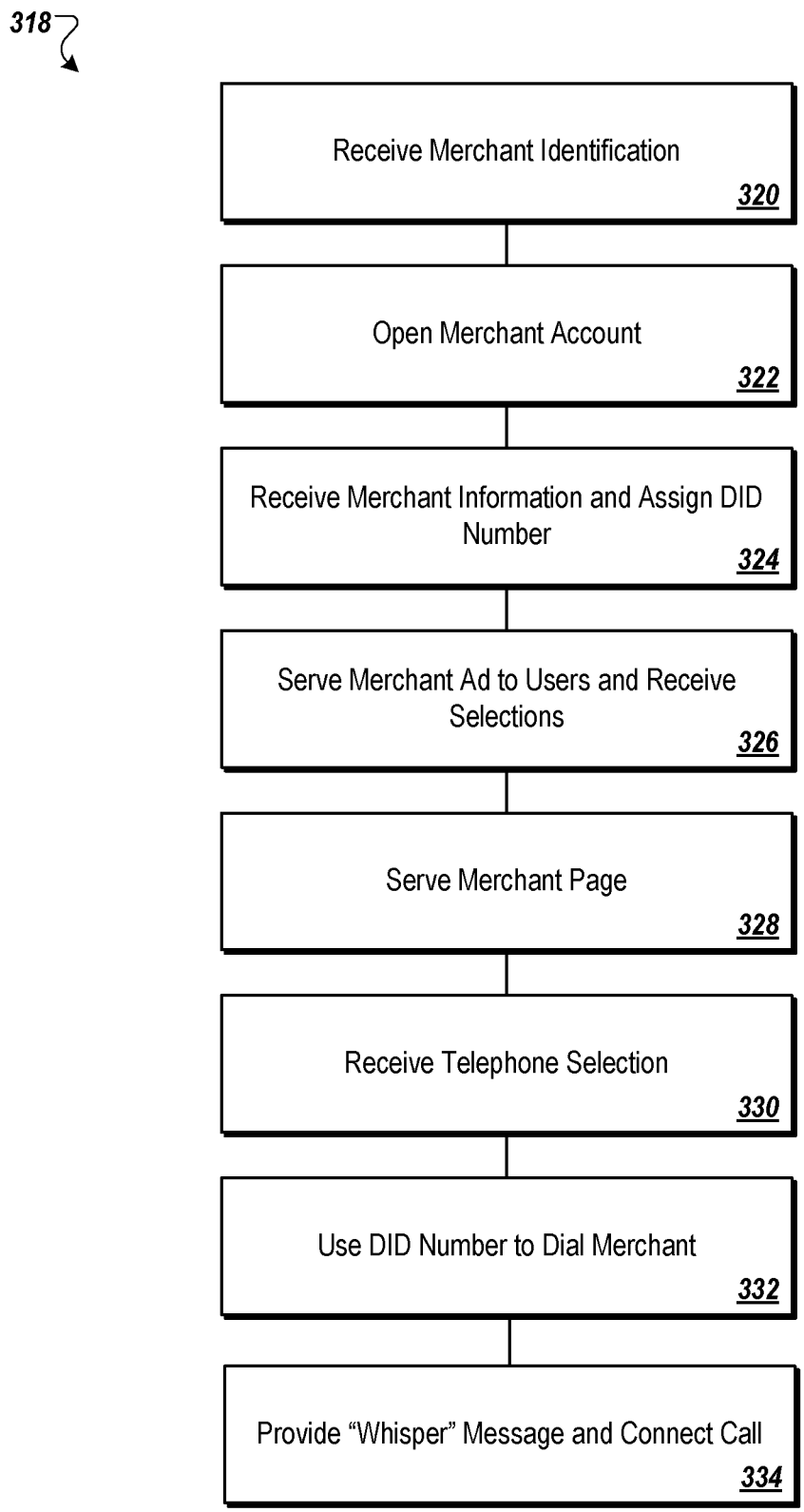
FIG. 3B is a flow chart of a process for serving a merchant-based landing page and receiving user interaction with the page.

FIG. 3B is a flow chart of a process 318 for serving a merchant-based landing page and receiving user interaction with the page. The example process 318 includes steps that may be used, for example, in providing advertisements and handling user responses to the advertisements in the systems 100 and 200, as described with respect to FIGS. 1 and 2, respectively. In general, the process shows actions that may be performed by a merchant/advertiser in establishing an advertising campaign and an alternative landing page to be associated with the campaign.

At box 320, merchant identification is received. As one example, a merchant whose business sells healthy foods may provide identification to an advertisement provider, such as GOOGLE ADWORD or some other advertisement provider 108, as described with respect to FIG. 1. The information may include the merchant's name, business address, telephone number, and so on. For example, the merchant may be the RiverBreezes Food Coop, specializing in natural foods. The merchant may have previously established basic account information, so that the provision of identification at this step may simply include the user logging onto the system.

The merchant's account is opened at box 322. For example, a new account for RiverBreezes may be opened within the data confines of the advertisement provider (e.g., GOOGLE ADWORDS) to which the merchant is bringing his natural foods advertisements for publishing on the Web. The account on the advertisement provider may be linked to various bank or other financial accounts that belong to the advertisement provider in order to receive payments from the merchant that are related to advertisements. At the same time, bank accounts or other funding options associated with the merchant may also be linked to the account that is opened with the advertisement provider. In this way, RiverBreezes may make automatic, electronic payments to the advertisement provider for advertisements published on the Internet on behalf of River-Breezes.

At box 324, merchant information is received, and a DID number is assigned to the advertisement (or to a campaign having multiple advertisements or multiple creatives). The merchant information may include all of the data that the merchant may provide to set up an advertisement, such as the merchant's name and address (e.g., the RiverBreezes Food Coop on 555 Lake Street), the type and format of the advertisement, keywords or other metadata that may trigger the advertisement (e.g., for targeted advertisements), detailed product information, text descriptions and titles, graphics, animation, audio, other parts of the ad creative, additional links (e.g., URLs of merchant-based landing pages), and so on. The merchant information may also include housekeeping or contractual information, such as the advertising campaign's duration, mutually agree-upon advertisement fees and pricing, payment schedules, etc.

Assigning the DID number may provide an intermediate telephone number, having a local area code that may appear in the merchant's ad, or in a group of related advertisements. The number may also be hidden, and the assignment and mapping of an intermediate number to the merchant's number may not be made visible to users. The intermediate telephone number may serve as, or be associated with, a user-selectable click-to-call link in the advertisement. The intermediate number may be assigned from a pool of available local telephone numbers, some of which may have been used in previous ads, re-used again only after a cooling-off period.

For example, if RiverBreezes is setting up an advertisement for a special deal on local, organic peaches, the RiverBreezes merchant may supply all of the information needed for the ad, including detailed product information for the special peaches. The DID number assigned to this particular advertisement for RiverBreezes may be a local 555-555-5555 telephone number. The telephone number, displayable in the advertisement (e.g., next to a "Call Our Store" caption) may be mapped to the RiverBreezes main telephone line (e.g., 123-555-0929). The mapping is performed and tracked by the advertisement provider.

At box 326, the merchant advertisement is served to users, and user selections are received. For example, a user searching for grocers or supermarkets in his new or existing neighborhood may enter a search query "local grocery stores" that returns web hits responsive to the query as well as advertisements targeted to the user. In such a case, the advertisements that are served may include the RiverBreezes Food Coop advertisement for a special on local, organic peaches. As a result of seeing the advertisement, the user may be enticed to interact with the advertisement, such as by clicking on controls within the advertisement, navigating to any secondary merchant-based landing pages, viewing maps or driving directions, studying reviews of the merchant that were posted by others, and viewing graphics associated with the advertisement (e.g., photos of very nice-looking local, organic peaches). The user interactions with the advertisement may in fact be user selections, such as if the user clicks on the link for a merchant-based landing page, interacts with a map, or selects the click-to-call link to initiate a telephone call with the merchant.

For example, a merchant-based landing page for the RiverBreezes Food Coop advertisement may be a web page that contains photos of the coop's produce aisle. This page may be an alternative landing page, meaning that it is not a page hosted by the advertiser, but is instead a page hosted by a company that host similar alternative landing pages for multiple companies, such as an organization that operates the advertising system. On that alternative web page, the user may view photos of the peaches, look at other customers' ratings of the store or the peaches, review a map to the store, print off a set of driving directions, or navigate to yet additional merchant-based pages.

The merchant page is served at box 328. For example, in response to the user selecting a link in the ad, such as a link for the merchant-based landing page labeled as "Visit Our Produce Section," the merchant-based landing page may be served, such as to display photos of various fruits and vegetables, their prices, and other information. The merchant page served may also include links of its own for accessing additional web pages associated with RiverBreezes.

At box 330, the telephone selection is received. For example, the user viewing and interacting with the River-Breezes advertisement may select the click-to-call number by clicking on the link displaying the telephone number. In this way, the user may begin initiating a telephone call with the merchant, using what appears to be a local number (e.g., 123-555-0929 if the user is in the 123 area code).

The DID number is used to dial the merchant at box 332. For instance, the call-to-click number 555-555-5555 appearing in the advertisement may be used to look up the associated actual number, which in the current example is the River-Breezes main telephone line (e.g., 123-555-0929). Using the actual number, the merchant may be called. The call may use the automatic number-to-number mapping established by the advertisement provider, and the translation may typically occur in real-time.

At box 334, a "whisper" message is provided, and the call is connected. For instance, when the telephone is answered on the RiverBreezes Food Coop's main telephone line, such as in the current example after the call is initiated by the user's selection of the click-to-call link, the store worker who answers the telephone may first hear a "whisper" message. Specifically, the "whisper" message may identify the source of the call, for example using a message such as "customer is likely calling about peaches featured in our Internet advertisement." After the whisper message has completely played and been heard (e.g., a few seconds later), the call may be connected, allowing the customer to talk directly with the merchant about the peaches featured in the advertisement.

Figure 4A:
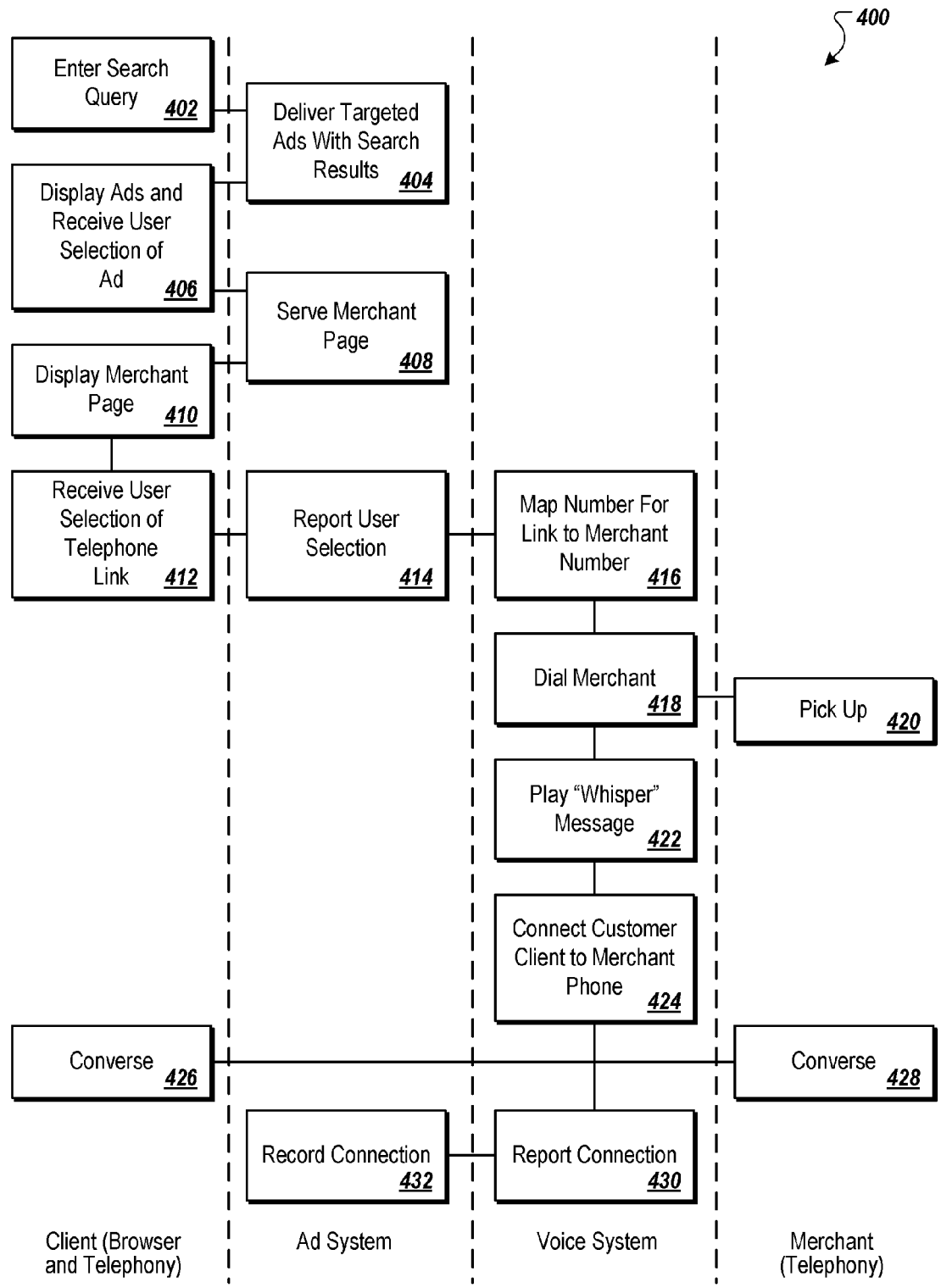
FIG. 4A is a swim lane diagram of a process for connecting a consumer to an advertiser via a telephone connection.

FIG. 4A is a swim lane diagram of a process 400 for connecting a consumer to an advertiser via telephone connection. The process 400 shows how various steps associated with serving targeted advertisements may be carried out by various components of a large system (e.g., systems 100 or 200). In this example process 400, the components include a user's client (e.g., a combined browser and telephone executing on the users smartphone or other device), the advertising system (or advertisement provider), a voice system, and a merchant (e.g., having telephony capabilities).

At box 402, a search query is entered. For example, the user may enter a search query such as "Pacific camping vacations" if, for example, the user is planning a camping trip to Washington State.

In response, search results and targeted advertisements are delivered at box 404. The search results may include the web hits matching the keywords and query terms that the user entered. The system may also deliver targeted ads, which may also be based on the search query, but may also be based on the user's location. For example, the user's location may be determined by GPS in the user's device, or the location may be based on the user's known city of residence other information. The targeted advertisements delivered in this case may include products and services related to camping, camping equipment, campgrounds, camping vacation packages, etc. The advertisements may also include specific information related to camping in the Pacific Northwest. The products and services included may be concentrated on local merchants (e.g., based on the user's general location).

At box 406, the advertisements are displayed (on the client) and user selection of an advertisement is received. For instance, after camping-related advertisements are displayed on the client device, the user may make specific selections from the ads, such as interacting with controls on the advertisements. As one example, the user may click on a control within the advertisement that displays additional information for special light-weight camping tents. The control may be a link to a merchant-based landing page that provides detailed product information on tents.

In some implementations, targeted advertisements that are delivered by the advertising system and displayed by the client may include merchant advertisements that correspond to the user's destination (e.g., the Pacific Northwest) if the advertising system can make that determination. Such information may be accessible by the user selecting a control such as "View merchants in your destination area?"

The merchant page is served in box 408. For example, the merchant page served that corresponds to detailed product information for camping tents may include information on specific tent models, including photos, specifications and prices or each individual tent.

The merchant page is displayed (on the client) at box 410. As a result, the user may see in web browser, for example, a web page full of specific information on various camping tents. Included with the information displayed on the web page may be a call-to-click link for a local merchant that sells those specific tents and generally has inventory in stock.

At box 412, user selection of a telephone link is received. For example, if the user clicks on the click-to-call link for the local merchant who sells camping tents, the user's browser may receive the user's selection.

The user selection is reported at box 414. The reporting here may occur within the advertising system, for example, in order to invoke the voice system to initiate a telephone call to the camping store merchant on behalf of the user.

At box 416, the telephone number for the link is mapped to the merchant's telephone number. For example, the telephone number seen by the user on the click-to-call link may simply be an intermediate local telephone number mapped to the merchant's actual telephone number. This step essentially intercepts the call so that the voice system may perform special processing, in this case preparing to precede the telephone call connection with a whisper message.

The merchant is dialed at box 418. For example, if the merchant is the store selling camping equipment, the store's actual telephone number is dialed by the voice system.

At box 420, the merchant picks up the call. In the current example, the person picking up the telephone to answer it may be an employee at the store that sells camping equipment. In some implementations, the knowledge that the call is in regard to tents may cause the call to be automatically routed to the department at the store that handles tents, thus the person answering the telephone may be a tent specialist and not just an average employee of the store. Alternatively, the person who answers the call may tailor his or her interaction based on the way in which the call originated with the system (e.g., based on the content of the advertisement to which the user is responding).

At box 422, the "whisper" message is played. The message is heard by the employee at the merchant site who had just picked up the telephone to answer the incoming call. In the current example, the whisper message may indicate the source of the call as "someone interested in tents who saw the Internet advertisement XYZ." Alternatively, the message may simply announce "This customer brought to you by XYZ advertising company."

At box 424, the customer is connected or bridged to the merchant telephone. At this time, the user who initiated the call to the merchant (e.g., at the sporting goods store) by clicking on the click-to-call link may now talk directly with one of the merchant's employees regarding products in the advertisement (e.g., light-weight camping tents).

At boxes 426 and 428, the client and merchant converse. The client's side of the conversation occurs on the client's telephone, for example, and may include questions about tents. At the same time, the merchant's end of the conversation occurs at a telephone associated with the merchant's location. In some implementations, the actual merchant telephone number may be remote from the merchant's physical location, such as in another state or country. This may be the case, for example, when a centralized call center handles telephone calls, particularly Internet advertisement sources telephone calls, for several merchants in a chain of stores, for instance.

At box 430, the connection is reported by the voice system. The report may indicate the telephone number used for the connection as well as the length of the call.

At box 432, the connection is recorded by the advertising system. Information recorded may be used in different ways, such as for billing purposes (e.g., when merchants are charged a cost for each connected call), for generating statistics (e.g., for comparing the number of connections to conversions to sales), or any other purposes. Recording information may include the data and time of the completed connection.

Figure 4B:
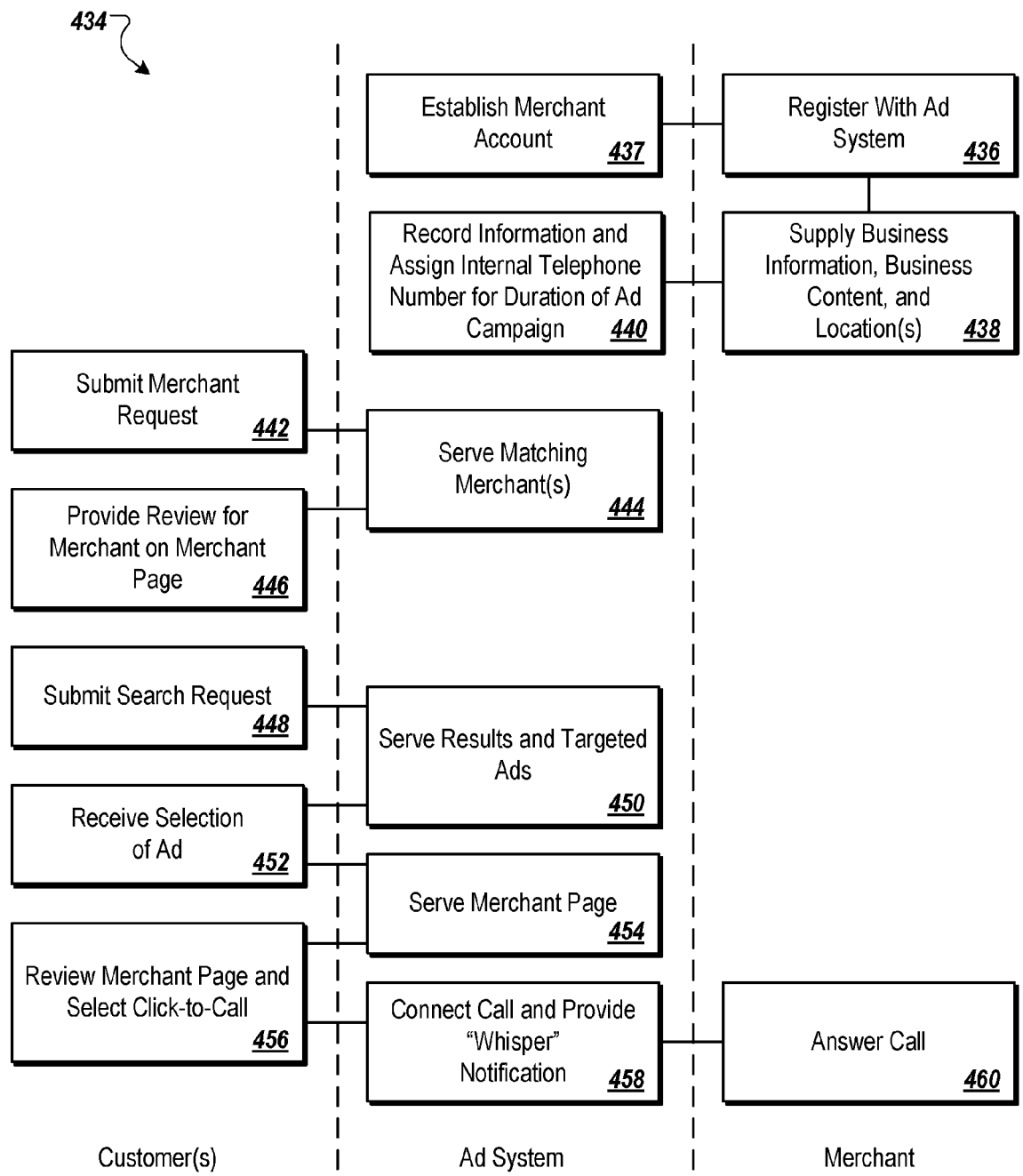
FIG. 4B is a swim lane diagram of a process for interacting with a merchant and a consumer with respect to a merchant-centered advertising page.

FIG. 4B is a swim lane diagram of a process 434 for interacting with a merchant and a consumer with respect to a merchant-centered advertising page. The process 434 may be used for the system 100, the system 200, or any other ad-related system that provides or manages online ads, specifically advertisements targeted to users based on various criteria. In general, the process shows an example sequence of interactions by a merchant in listing an advertisement, a consumer interacting with and responding to the advertisement, and a representative of the merchant handling the response by the consumer via a telephonic connection.

At box 436, the merchant registers with the advertising system. For example, the merchant may be a local pet store called Shorty's, short for Shortsifers Dog Emporium. During registration, Shorty's owner may contact a representative of the advertising system (e.g., either online, over the telephone, by mail, or in person) and provide the pet store's name, address, ZIP code, contact information, payment and bank account information, and so on. In some implementations, the "representative" may be an automated online registration system.

The advertising system establishes the merchant account at box 437. As an example, using the information provided by Shorty's owner or representative, the advertising system may establish an advertising account for Shorty's, making it possible for Shorty's to set up advertisements from that point forward.

At box 438, the merchant supplies business information, business content, and one or more merchant locations. Continuing the current example, Shorty's owner may provide information for a new Internet-based advertisement it wishes to place with the advertising system. As an example, the new advertisement may be for an innovative dog toy called Mister Squeakers that just came on the market. The business information that Shorty's owner provides may include, for example, the URLs of the merchant's home page (e.g., ShortysPets.com) and any associated merchant-based landing pages (e.g., ShortysPets/products.com, ShortysPets/grooming.com, etc.) corresponding to products or services that the merchant may provide. The business content may include, for instance, the detailed web page content, including text, graphics, maps, audio, video, animation, click-to-call numbers, identification of alternative landing pages, and so on.

At box 440, the advertising system records the merchant information and assigns an internal telephone number for the duration of the advertising campaign. In the current example, the advertising system may record the information for Shorty's new advertisement for the Mister Squeakers toy. For the click-to-call link in the new ad, the advertising system may assign a local DID number to appear in the link within the advertisement. For example, the DID assigned may be obtained from a pool of available local telephone numbers that are not already in use in other advertising campaigns. Local telephone numbers may be in the same area code as the customer, or in a group of area codes that permit a toll-free call. In some cases, a new advertisement may use the same DID number if, for example, the merchant already has the same DID number in a click-to-call link of a similar existing ad, but mapped to the same actual merchant telephone number. Regardless, the internal telephone number assigned enables users of the advertisement to reach an actual merchant telephone number, such as the merchant's main telephone (e.g., Shorty's switchboard or main customer support line) or another number (e.g., Shorty's dog products department or grooming service).

The customer submits a merchant request at box 442. As an example, a customer named Alice may formulate a search query in her browser related to pets, such as "pet stores dogs" in order to find local pet stores that may carry products for dogs. In some cases, the customer request may follow the customer's recent interaction with the merchant, such as if the customer just purchased a product from the merchant (e.g., buying a Mister Squeaker's toy at Shorty's) and now wants to leave a review. The query may be similar to the one that the customer used the previous day in locating Shorty's in her general area. In some cases, a customer's general query terms may be used, for example, when the customer does not know or cannot remember an exact merchant name (e.g., "Shortsifers" or "Shorty's").

At box 444, the advertising system serves the matching merchant(s) in response to the customer's merchant request. For instance, the advertising system may provide, in response to the customer query, search results that include a hit list of pet stores in the general area (e.g., a 10-mile radius). If the customer (e.g., Alice) lives relatively close to Shorty's, the hit list may include an entry that identifies Shorty's. Navigating from the list of matching merchant's, the customer may land on a merchant-based page, such as a web page containing existing user reviews and user interface controls for leaving new reviews.

At box 446, the customer provides a review for the merchant on the merchant page. For instance, if the customer is rating a particular merchant (e.g., Shorty's), the customer (e.g., "Alice") may use controls on a merchant review page to rate the merchant, including detailed ratings and an overall score, with optional comments (e.g., "My dog LOVES his new squeaking toy!").

A customer (e.g., a different customer named Betty) submits a search request at box 448. For example, living just down the street from Alice may be Betty, who also owns a dog. Betty may be on her computer searching for area pet stores, and she may enter a query such as "area pet stores dogs" in order to find a nearby pet store selling dog products.

At box 450, the search results and targeted advertisements are served. For instance, in response to Betty's query, search results of area pet stores are returned, and included with the search results may be targeted advertisements related to Betty's search terms in addition to her geographic area or other factors (e.g., user profiles, etc.). One of the advertisements served may be for Shorty's, just a few miles or minutes away. The advertisement may feature an innovative dog toy called Mister Squeakers that just came on the market, of which Shorty's has hundreds of inventory in stock, in various colors.

At box 452, the customer selects an advertisement from the advertisements provided by the advertising system. For example, upon simply seeing the advertisement for Mister Squeakers, Betty may be interested in inquiring more information regarding the new toy. She may select that particular advertisement from many that are served at the same time, such as multiple targeted advertisements which all relate to Betty's search results.

The advertising system serves the merchant page at box 454. Continuing with the current example, the merchant page served may be one of the web pages that Shorty's identified when setting up the advertising campaign, and in particular, the merchant-base web page designated to be served if a user clicks on the advertisement for the "Mister Squeakers" dog toy. The merchant page served in this case may prominently feature the Shorty's pet store, or the closest facility in the national chain of Shorty's stores. The merchant page may also provide considerable information on the "Mister Squeakers" dog toy, including product information, testimonials, video of a dog playing with and exposing the unique features of the toy, and a click-to-call link tied to the merchant, to name a few examples.

At box 456, the customer reviews the merchant page received from the advertising system and selects the click-to-call control. Betty, for example, may review the information on the Shorty's web page, including taking a look at past customer reviews (e.g., by Alice and others) of Shorty's and the toys it sells. As a result of reading the reviews and watching the dog video, Betty may be so interested in obtaining a full set of the Mister Squeakers toys that she feels compelled to dial up the merchant right away and reserve a few toys. Thus, Betty may select the click-to-call link (e.g., labeled "Call Shorty's about buying Mister Squeakers toys for YOUR dog") to initiate the call to the merchant.

At box 458, the advertising system connects the call and provides a "whisper" notification. In the current example, the advertising system may connect Betty's call, using the click-to-call number to look up Shorty's actual number. As part of the process, the advertising system may provide a "whisper" message such as "another Internet-sourced call about our new Mister Squeakers toy."

The merchant answers the call at box 460. At this time, the merchant, such as an employee at Shorty's, may begin talking directly to the customer (e.g., Betty) about the dog toy of interest. The merchant may also benefit from having knowledge of the source and reason for the call, including that it is based on the merchant's Internet advertisement and involves a specific product of interest that the merchant sells.

Figure 5A:
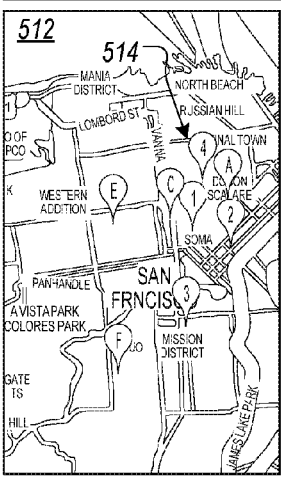
FIG. 5A is a screen shot showing example targeted advertising results for a search query.

FIG. 5A is a screen shot 500 showing example targeted advertising results for a search query. In general, the results are shown in a manner like that traditionally shown for GOOGLE search results and targeted advertisements, with search controls 502 across the top of the screen, sponsored links of a first group 504 laterally across the screen below that, and search results 506 below that. Additional sponsored links with ad content or creatives are shown down the right side of the screen (508). A "one box" 510 showing preformatted results for the search, rather than portions of a landing page as with the lower results, is also shown at the top of the results 506. This one box result 510 displays a map 512 populated with pins 514 that correspond to the search results 506 and the sponsored links 504 that have a corresponding geographic location. The particular "local" results in this example include bookstores in an area that is around the users or that was suggested by the user's query 516 (i.e., "bookstores sf," which the system interpreted as asking for bookstores in San Francisco).

Additionally, local ad results are also shown in the map 512 using different forms of pins 514, which are labeled with numbers that correlate to ad text in the advertisement sponsored links 504 box above (whereas pins for the natural search results 506 are labeled with letters to distinguish the two forms of pins; different colors may also be used on the pins).

Selectable objects, in the form of links that overlay URLs, are also shown in the sponsored links section 504 for the title of each advertisement, URL's for the web pages of the advertisers, links to have the system generate a map with directions from the user's current location to the particular advertiser facility, and a telephone number for the particular advertiser.

The advertiser URL, when selected, may simply take the user to the advertiser's home page as a landing page form the search results screen. Selection of the advertisement title may also take the user to the home page of the advertiser, or in other implementations may take the user to an alternative landing page, which may be correlated only with the particular displayed advertisement, with a group of advertisements, or with the advertiser itself. The content of the alternative landing page is discussed in detail above and below.

In some implementations, the telephone number may be selectable. Such selection of the number by a user may simply cause the user's device to dial the number directly. Alternatively, the number may be an intermediate number or a mask for an intermediate number that causes an actual number for the merchant to be dialed. Such use of an intermediate number is described above and can provide advantages, in certain implementations, such as permitting an advertising system to track user response to advertisements, to provide information to an advertiser so that the advertiser may customize their verbal interaction with a customer on an incoming call, and to provide simplified telephonic connections between customers and merchants.

Figure 5B:
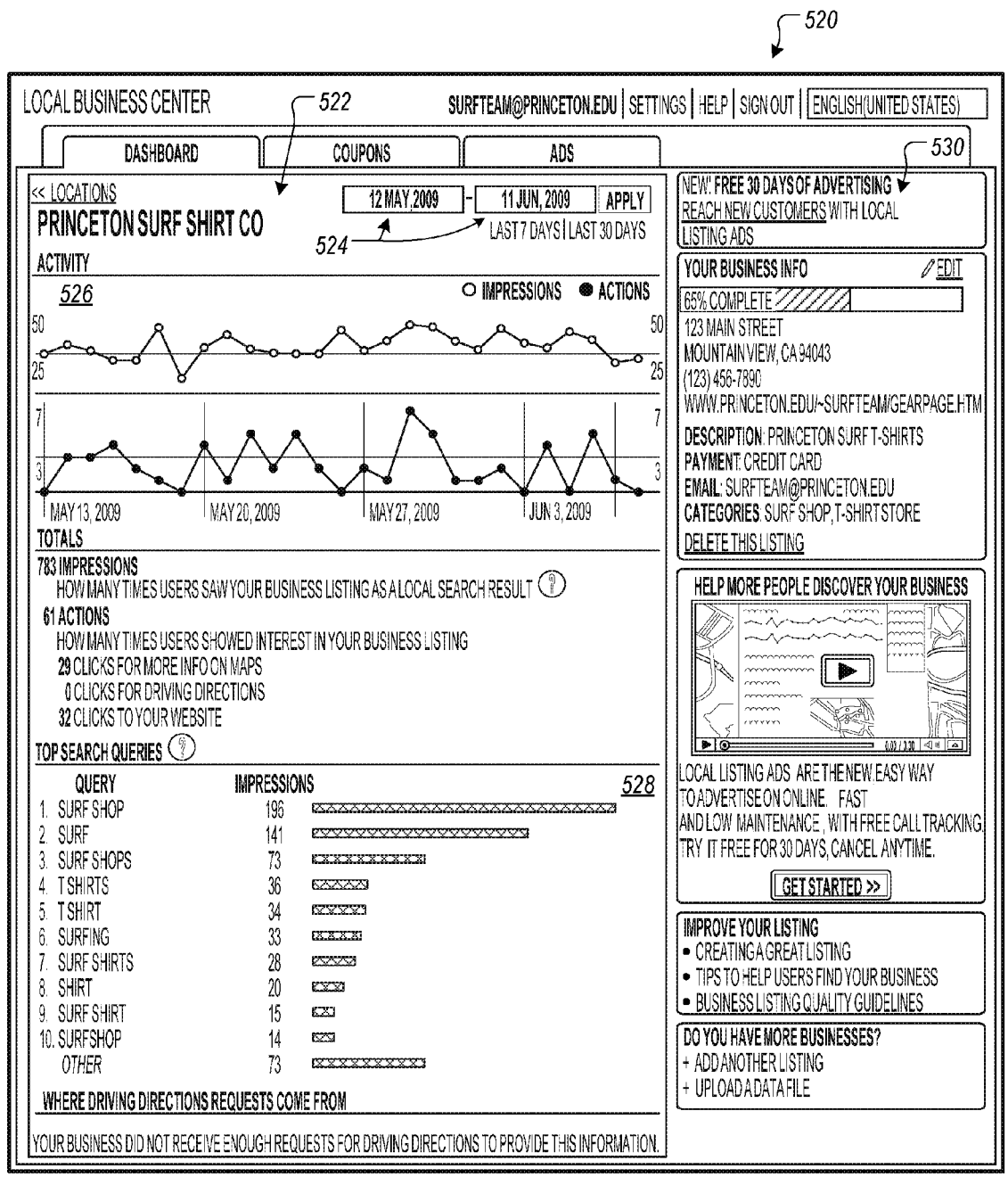
FIG. 5B is a screen shot of a statistical view for an advertiser associated with a targeted advertising campaign.

FIG. 5B is a screen shot 520 of a statistical view for an advertiser associated with a targeted advertising campaign. In general, the screen shot 520 shows a dashboard 522 that allows an advertiser to track the performance of an advertisement or advertising campaign like those discussed above. Boxes 524 near the top of the screen allow the advertiser to set a time period during which they want information about the advertisement or campaign to be displayed. A graph 526 below that shows, graphically, the number of times an advertisement was displayed across the time period (i.e., impressions) and the number of times users reacted to the advertisement, such as by selecting a click-to-call option in order to be connected to the advertiser telephonically. Numerical breakdowns of user activity with respect to the advertisement or campaign are also shown. Lower on the screen is shown the particular query terms 528 that users entered in order to have the advertisement shown to them. These query terms may correlate to a list of key words that the advertiser initially identified as word that would trigger the consideration of the advertisement for display (i.e., by placing the advertisement into an auction with other responsive advertisements). Other general information about the advertiser and various offers for the advertiser are shown down the right edge of the screen 530. The display shown here may typically be shown to an advertiser some time after the advertiser starts a campaign, and when the advertiser is trying to judge the performance of the campaign.

Figure 5C:
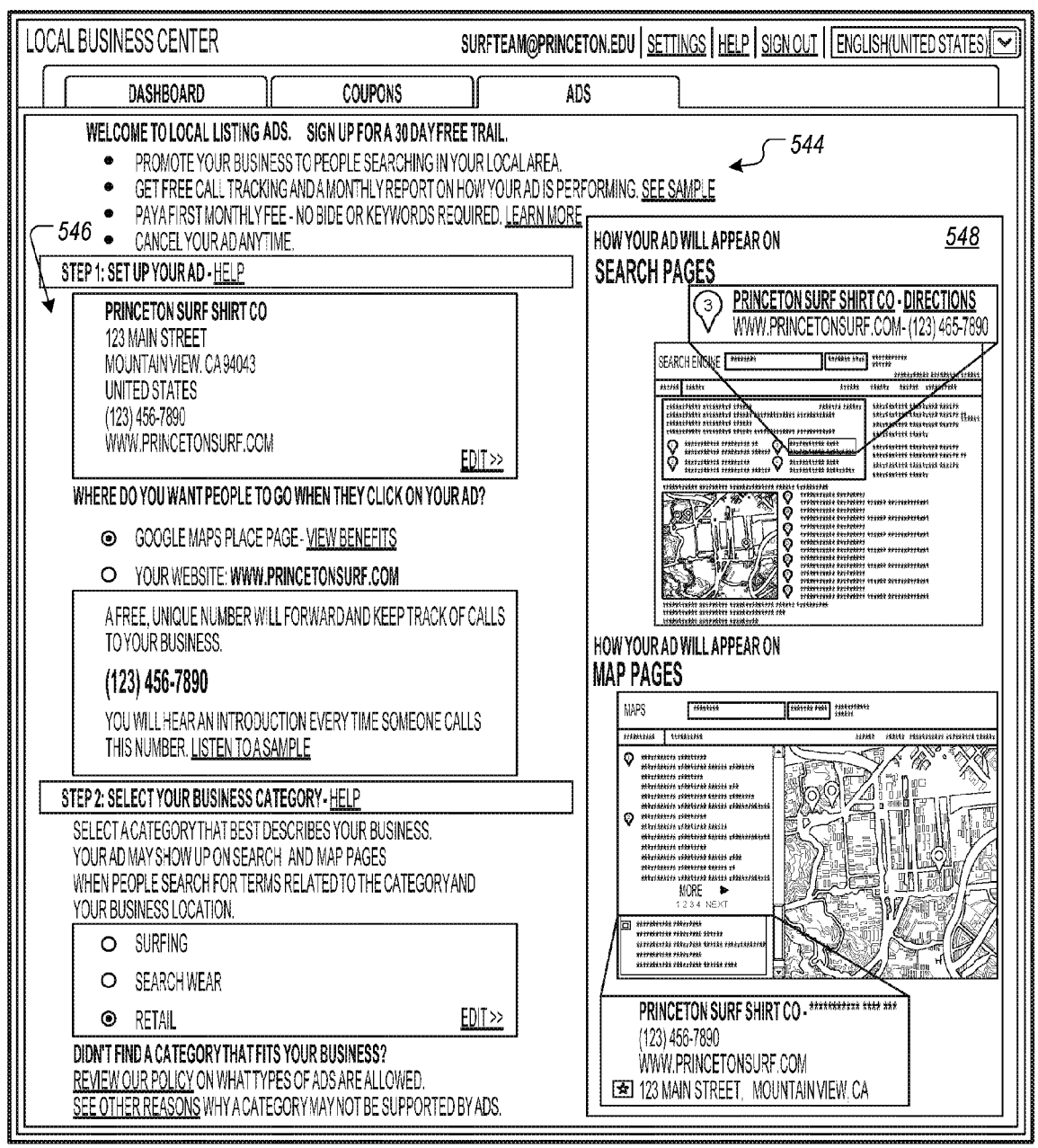

FIGS. 5C and 5D show two portions of a screen shot of an sign up page for a targeted local advertising system, where the top part of the screen 540 is shown in FIG. 5C and the bottom part of the same screen 542 is shown in FIG. 5D. In general what is shown is an example interface that may be shown to an advertiser who is trying to set up a targeted advertisement that may involve an alternative landing page and the ability to telephonically connect viewers of the advertisement to the merchant. Instructions 544 are shown at the top of the screen 540, and opportunities for the merchant to enter information about themselves and about the advertisement run down the left side of the screen (546). For example, the merchant can enter basic information about their business, can choose whether selection on their advertisement will take a user to their home page or to an alternative landing page that is run by the advertising management company, and target topics for targeting the advertisement to users. On the right side of the screen are previews 548 so that the advertiser can see what the advertisement will look like to users, and additional instructions 550.

Figure 5E:
FIG. 5E is a screen shot showing basic summary data for an advertising campaign.

FIG. 5E is a screen shot 560 showing basic summary data for an advertising campaign. This screen 560 shows a particular example of a report 562 that an advertiser may be shown after they have started running an advertisement 564 that is provided with telephonic connection capabilities. The particular information provided to the advertiser can include the number of times the advertisement 564 has been shown (566), the number of times it resulted in a consumer placing a call to the merchant through the system (568), and the number of times a user otherwise interacted with the advertisement (570). Such information is shown in these screen shots 500, 520, 540, and 560 in a simplified manner, and is directed to a small merchant without sophisticated advertising needs. Similar interfaces may be provided to advertisers who have many advertisements (e.g., tens of thousands) running, and who need to keep track of aggregate statistics for the many advertising campaigns.

Figure 6:
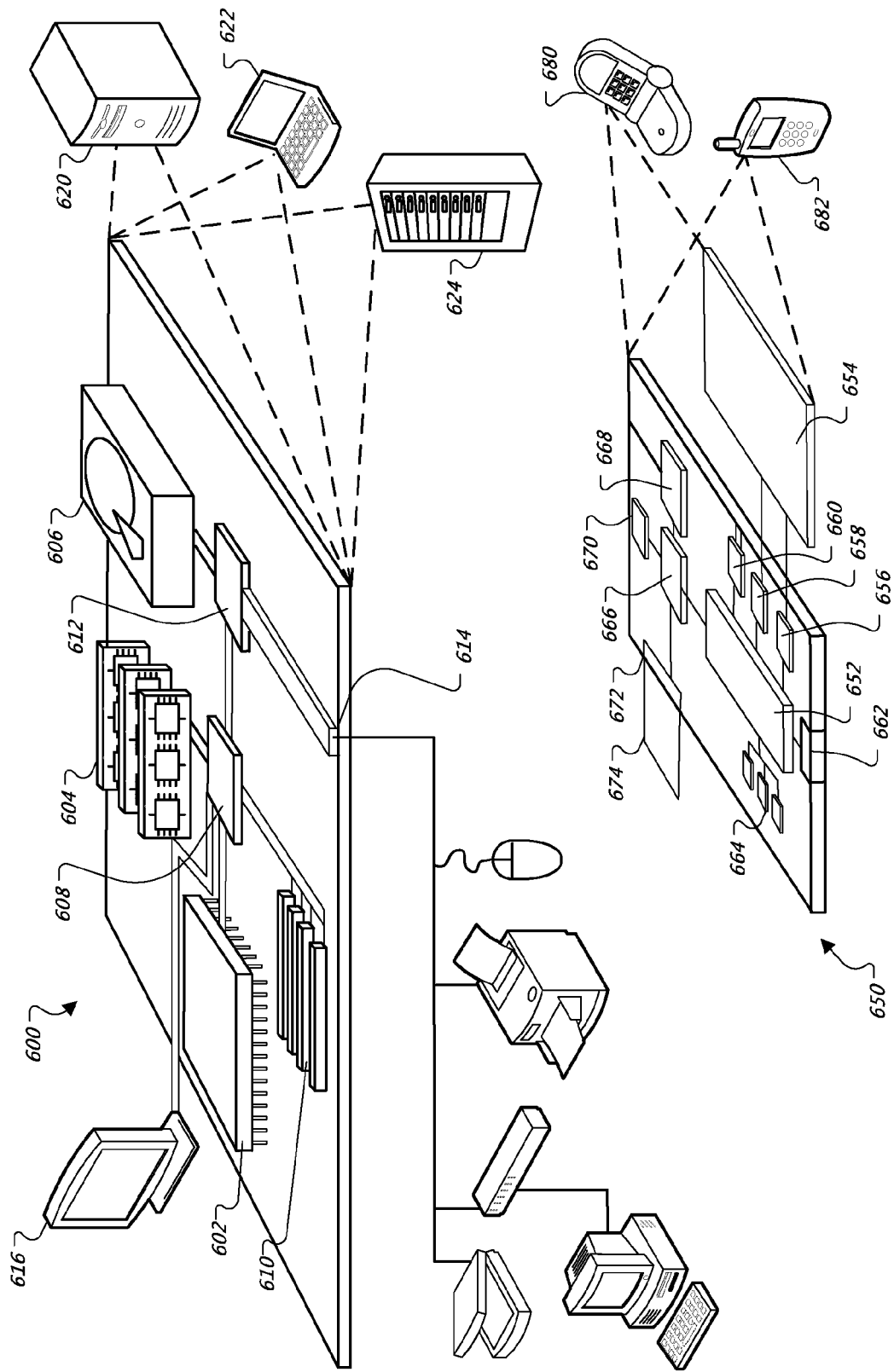
FIG. 6 shows examples of generic computer devices that may be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for managing telephonic connections, the method comprising:
    transmitting from a computer server system, for display on an electronic communication device, an advertisement from an advertiser;
    receiving, at a calling system and from the electronic communication device, a request to be connected telephonically with the advertiser, the request being received in response to user interaction with the advertisement of the advertiser;
    connecting the calling system telephonically to a telephone of the advertiser;
    automatically providing, by the calling system, a predetermined audio message to the telephone of the advertiser after connecting telephonically with the telephone of the advertiser, the predetermined audio message identifying the advertisement to the advertiser; and
    connecting the electronic communication device telephonically with the telephone of the advertiser after providing the predetermined audio message.

2. The computer-implemented method of claim 1, further comprising mapping an identifier from the advertisement to a telephone number for the advertiser and dialing the telephone number.

3. The computer-implemented method of claim 2, wherein the identifier comprises an intermediate private telephone number that is dialed from the electronic communication device and bridged to the advertiser.

4. The computer-implemented method of claim 1, further comprising maintaining a pool of intermediate telephone numbers, assigning the intermediate telephone numbers temporarily to advertisements while the advertisements are active on the computer server system, and reassigning the telephone numbers to other advertisements while the other advertisements are active on the computer server system.

5. The computer-implemented method of claim 4, wherein the telephone numbers are reassigned to the other advertisements after a predetermined period of time has elapsed since the telephone numbers were previously active.

6. The computer-implemented method of claim 1, wherein the predetermined audio message identifies an organization that operates the calling system.

7. The computer-implemented method of claim 1, wherein the predetermined audio message identifies the advertiser.

8. The computer-implemented method of claim 1, further comprising, in conjunction with providing the predetermined audio message, providing electronic information associated with the predetermined audio message to a computer system associated with the advertiser through a back-channel data connection.

9. The computer-implemented method of claim 1, further comprising:
    receiving, at the computer server system, information about content requested by a user of the electronic communication device;
    receiving data specifying the user interaction with the advertisement; and
    in response to the user interaction with the advertisement, providing to the electronic communication device an alternative landing page that is provided for each of a plurality of different advertisers, wherein the provided alternative landing page includes information corresponding to the advertisement.

10. The computer-implemented method of claim 9, wherein the alternative landing page comprises information selected from a group consisting of user reviews concerning the advertiser, a map to a facility associated with the advertiser, and a click-to-call object that when selected by the user causes the user to be connected telephonically with the advertiser.

11. The computer-implemented method of claim 9, further comprising:
    identifying a current geographic location of the user; and
    selecting information associated with the advertisement or the advertiser that pertains to the current geographic location of the user;
    wherein the alternative landing page comprises at least a portion of the selected information.

12. The computer-implemented method of claim 1, wherein connecting the electronic communication device telephonically with a telephone of the advertiser after providing the predetermined audio message comprises:
    identifying an audible characteristic of the predetermined audio message; and
    connecting the electronic communication device telephonically to a particular telephone extension of the advertiser based on the audible characteristic.

13. The computer-implemented method of claim 1, further comprising causing a script related to the advertisement to be triggered for the advertiser.

14. A computer-implemented system, comprising:
    a server interface arranged to receive requests from users of computing devices and to provide responses for use by the user of the computing devices;
    an advertisement server arranged to select advertisements in response to user requests, and, for each user selected advertisement, to provide calling information in response to the user selection of the advertisement; and
    a telephonic connection server arranged to:
        receive the calling information from the advertisement server;
        connect telephonically with a telephone of an advertiser associated with the user selected advertisement, the telephone of the advertiser being identified by the calling information;
        provide a message that identifies the user selected advertisement to the telephone of the advertiser; and
        connect a user telephonically with the telephone of the advertiser.

15. The computer-implemented system of claim 14, wherein the telephonic connection server includes a map that correlates internal intermediate telephone numbers received from the advertising server to public telephone numbers of advertisers for connecting the user with the target.

16. The computer-implemented system of claim 14, wherein the advertisement server is further arranged to manage a pool of intermediate telephone numbers that are arranged to be assigned temporarily to advertisements while the advertisements are active on the advertisement server, and reassigned to other advertisements while the other advertisements are active on the advertisement server.

17. The computer-implemented system of claim 16, wherein the advertisement server is further programmed to reassign the telephone numbers to the other advertisements after a predetermined period of time has elapsed since the telephone numbers were previously active.

18. The computer-implemented system of claim 14, wherein the message identifies an organization that operates the telephonic connection server.

19. The computer-implemented system of claim 14, wherein the message identifies an organization that operates the advertisement server.

20. The computer-implemented system of claim 14, wherein the message identifies the advertiser.

21. The computer-implemented system of claim 14, wherein the advertisement server is further arranged to provide code for an alternative landing page that is not served by the advertising server.

* * * * *